United States Patent
Kyo

(10) Patent No.: US 9,495,213 B2
(45) Date of Patent: Nov. 15, 2016

(54) ARITHMETIC CONTROL APPARATUS, ARITHMETIC CONTROL METHOD, NON-TRANSITORY COMPUTER READABLE MEDIUM STORING PROGRAM, AND OPEN CL DEVICE

(71) Applicant: Renesas Electronics Corporation, Kawasaki-shi (JP)

(72) Inventor: Shorin Kyo, Kawasaki (JP)

(73) Assignee: RENESAS ELECTRONICS CORPORATION, Kawasaki-shi, Kanagawa (JP)

( * ) Notice: Subject to any disclaimer, the term of this patent is extended or adjusted under 35 U.S.C. 154(b) by 110 days.

(21) Appl. No.: 14/600,959

(22) Filed: Jan. 20, 2015

(65) Prior Publication Data

US 2015/0227466 A1    Aug. 13, 2015

(30) Foreign Application Priority Data

Feb. 10, 2014    (JP) ................................ 2014-023044

(51) Int. Cl.
G06F 12/00    (2006.01)
G06F 9/50    (2006.01)
G06F 12/02    (2006.01)

(52) U.S. Cl.
CPC ......... *G06F 9/5016* (2013.01); *G06F 12/0207* (2013.01)

(58) Field of Classification Search
None
See application file for complete search history.

(56) References Cited

U.S. PATENT DOCUMENTS

| 2013/0024667 | A1  | 1/2013 | Kyo     |             |
|--------------|-----|--------|---------|-------------|
| 2014/0040552 | A1* | 2/2014 | Rychlik | G06F 12/0815 |
|              |     |        |         | 711/122     |
| 2015/0032970 | A1* | 1/2015 | Francis | G06F 12/0815 |
|              |     |        |         | 711/141     |

FOREIGN PATENT DOCUMENTS

JP    2013-25547 A    2/2013

OTHER PUBLICATIONS

The OpenCL Specification, Ver:1.0, Document Revision:43, Khronos OpenCL Working Group (2009), Aaftab Munshi. Month Unknown.

* cited by examiner

*Primary Examiner* — Baboucarr Faal
(74) *Attorney, Agent, or Firm* — McGinn IP Law Group, PLLC

(57) ABSTRACT

When executing a first kernel and a second kernel related to each other by the arithmetic unit, if an allocation attribute of a continuous write block of the first kernel and an allocation attribute of a continuous read block corresponding to the continuous write block of the second kernel are the same, a scenario determination unit executes the first kernel and the second kernel in a pipeline by using the continuous write block for execution of the second kernel through the private memory or the local memory without transferring it to the global memory. At this time, the scenario determination unit logically adds a margin attribute and a dependence attribute of the continuous read block of the second kernel respectively to a margin attribute and a dependence attribute set for the read block for each of the read block of the first kernel.

4 Claims, 23 Drawing Sheets

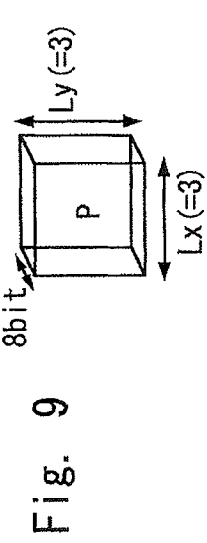
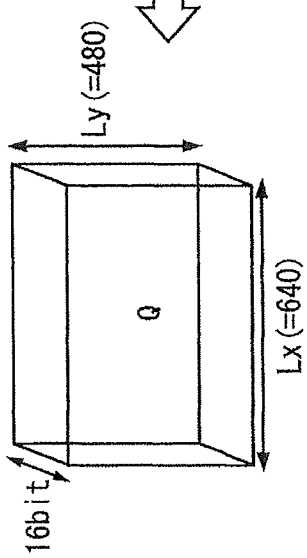
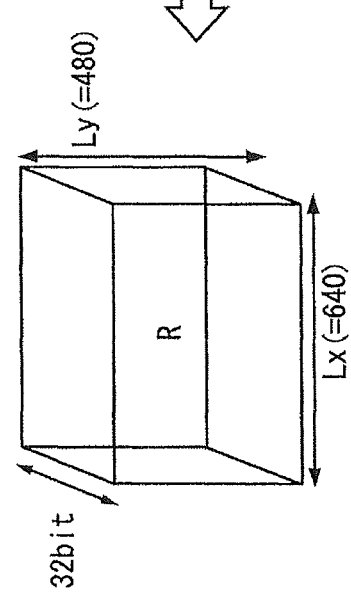
Fig. 9

EXAMPLE OF PARAMETERS
INDICATING CONFIGURATION OF ARITHMETIC UNIT

- PRIVATE MEMORY CAPACITY FOR EACH WORK ITEM (WI) : 1KB
- LOCAL MEMORY CAPACITY FOR EACH WORK GROUP (WG) : 4KB
- MAXIMUM VALUE OF WG SIZE (WGs) : 32
- MAXIMUM VALUE OF NUMBER OF WG : 16

Fig. 10

WORK GROUP SIZE WGs=32
<HIERARCHICAL LEVEL 1>
・PRIVATE MEMORY OCCUPANCY FOR EACH WI OF EACH DATA BLOCK
 WHEN NUMBER OF SEGMENTS IS 4 (SUB-BLOCK Y-DIRECTION SIZE Sbsy)
・READ BLOCK Q : FOR EACH WI 129×2B (=0.258KB/WI)
・WRITE BLOCK R : FOR EACH WI 120×4B (=0.480KB/WI)
・NUMBER OF REPETITIONS : 5 (=NUMBER OF SEGMENTS 4× (640÷WG SIZE32)÷NUMBER OF WG 16)
<HIERARCHICAL LEVEL 2>
・NUMBER OF SEGMENTS : 1
・READ BLOCK P
 TO LOCAL MEMORY WITHOUT SEGMENTATION
・NUMBER OF REPETITIONS : 1

Fig. 12

|  | Global | Constant | Local | Private |
|---|---|---|---|---|
| Host | Dynamic allocation | Dynamic allocation | Dynamic allocation | No allocation |
|  | Read / Write access | Read / Write access | No access | No access |
| Kernel | No allocation | Static allocation | Static allocation | Static allocation |
|  | Read / Write access | Read-only access | Read / Write access | Read / Write access |

PRIOR ART

1. SPECIFICATIONS FOR READ TRANSFER
   INCLUDING PART DEPENDING ON CONTENT OF ARITHMETIC PROCESSING AND CONFIGURATION OF DEVICE
   (SEE EXAMPLES BELOW)
   · EXAMPLE 1: SPECIFICATION WHETHER TO SEGMENT READ BLOCK
   · EXAMPLE 2: SPECIFICATION OF WAY OF SEGMENTATION WHEN SEGMENTING READ BLOCK
   · EXAMPLE 3: SPECIFICATION OF WAY OF ASSOCIATION BETWEEN SUB-READ BLOCKS INCLUDED IN
     DIFFERENT READ BLOCKS WHEN SEGMENTING READ BLOCK

2. SPECIFICATIONS OF ARITHMETIC PROCESSING ON READ BLOCK OR SUB-BLOCKS
   INCLUDING PART DEPENDING ON CONFIGURATION OF DEVICE (SEE EXAMPLES BELOW)
   · EXAMPLE 4: SPECIFICATION OF NUMBER OF TIMES OF PARALLEL EXECUTION OF ITEMS
     IN CONFORMITY TO SPECIFICATION FOR READ TRANSFER

3. SPECIFICATIONS FOR WRITE TRANSFER
   INCLUDING PART DEPENDING ON CONTENT OF ARITHMETIC PROCESSING AND CONFIGURATION OF DEVICE
   (SEE EXAMPLES BELOW)
   · EXAMPLE 5: SPECIFICATION IN CONFORMITY TO SPECIFICATION FOR READ TRANSFER

Fig. 23

1. SPECIFICATIONS OF ATTRIBUTE GROUP
(1) UNIQUE ATTRIBUTE: ATTRIBUTE NOT RELEVANT TO ARITHMETIC CONTENT AND USER'S INTENTION
(2) ARITHMETIC ATTRIBUTE: ATTRIBUTE RELEVANT TO ARITHMETIC CONTENT AND NOT RELEVANT TO USER'S INTENTION
(3) POLICY ATTRIBUTE: ATTRIBUTE RELEVANT TO ARITHMETIC CONTENT AND USER'S INTENTION
NONE IS RELEVANT TO DEVICE CONFIGURATION

2. SPECIFICATIONS OF USER PROCESSING
SPECIFICATION OF ARITHMETIC CONTENT AND NOT RELEVANT TO DEVICE CONFIGURATION

RELATED ART

ARITHMETIC CONTROL APPARATUS, ARITHMETIC CONTROL METHOD, NON-TRANSITORY COMPUTER READABLE MEDIUM STORING PROGRAM, AND OPEN CL DEVICE

CROSS-REFERENCE TO RELATED APPLICATIONS

This application is based upon and claims the benefit of priority from Japanese patent application No. 2014-23044, filed on Feb. 10, 2014, the disclosure of which is incorporated herein in its entirety by reference.

BACKGROUND

The present invention relates to a parallel processor and, specifically, to an arithmetic control technique of an OpenCL device.

Recently, a trend of improving the performance by increasing the number of processor cores (which are hereinafter referred to simply as "cores") that perform processing in parallel instead of increasing the operating frequency of a processor has become remarkable because of the need for preventing overheating of t processor. A processor having a plurality of cores is called a multi-core processor, and a multi core processor having a large number of cores is particularly called a many-core processor. In this specification, the multi-core processor and the many-core processor are not particularly distinguished from each other, and a processor including a plurality of cores that perform processing in parallel is generally referred to as "parallel processor".

The parallel processor is used in various fields as an accelerator. However, because various types of accelerators are manufactured by various manufactures and in various fields and further various languages and frameworks for accelerators are developed, sharing of a program code among accelerators is difficult.

To solve this problem, an OpenCL (Open Computing Language) is defined as a standard framework for the parallel processor (Non Patent Literature 1: The OpenCL Specication, Ver:1.0, Document Revision:43, Khronos OpenCL Working Group (2009)). The overview of OpenCL is described hereinbelow.

FIG. 17 is a diagram where reference symbols are added to FIG. 3.1 in the above Non Patent Literature 1, which shows a platform model of a typical OpenCL system.

As shown in FIG. 17, an OpenCL system 10 includes a host 12 and one or more compute devices (which are referred to hereinafter as "OpenCL devices") 14. The OpenCL devices 14 correspond to the accelerator described above.

Each of the OpenCL devices 14 includes one or more compute units (which are hereinafter abbreviated as "CU") 16, and each of the CU 16 includes one or more processing elements (which are hereinafter abbreviated as "PE") 18. Note that the processing elements PE18 correspond to the cores described above.

An OpenCL application is composed of a program code that runs on the host 12 and a program code that runs on the OpenCL devices 14, which are accelerators. The program code that runs on the host 12 is called "host code", and the program code that runs on the OpenCL devices 14 is called "kernel".

The host 12 calls API (Application Program Interface) and indicates arithmetic processing. The OpenCL devices 14 execute the indicated arithmetic processing. The host 12 generates a context for management of resources and further generates a command queue for mediation of device operation through OpenCL. "Device operation" includes executing arithmetic processing, operating memories, achieving synchronization and the like.

In OpenCL, the kernel is executed in the $N(1 \leq N \leq 3)$-dimensional index space as work-item (which is also referred to simply as "item"). For example, if (4,6) is specified as the two-dimensional index space, total 24 (4×6) items are executed.

To execute one item, one PE is used. Accordingly, in the case where the number of items executed in parallel and the number of existent PE are the same, the kernel is executed on the total 24 PE with four columns by six rows.

Note that, in the case where the number of existent PE is smaller than the number of items executed in parallel, parallel execution of items is repeated on the existent PE. For example, in the case where the above-described (4,6) index space is specified when there are only total six PE with two columns by three rows, parallel execution of six items needs to be repeated four times by the six PE.

Further, in OpenCL, the concept of work-group is introduced. The work group is a group of items that are executed on the same CU 16 and related to one another. The respective items in the same work group execute the same kernel and share a local memory, which is described later, of the CU 16.

A unique group ID is assigned to each work group, and a local ID that is unique in the work group is assigned to the item in each work group. Further, a unique global ID is also assigned to the item. The item can be identified by the global ID or a combination of the group ID and the local ID.

A process for the OpenCL device 14 to perform arithmetic processing is implemented by calling API in the following sequential steps.

<Step 1>: Transfer reference data for arithmetic processing (which is referred to hereinafter as "reference data") and a kernel from the host 12 to the OpenCL device 14.

<Step 2>: Start execution of the kernel on the OpenCL device 14 by "kernel start command".

<Step 3>: After completing execution of the kernel on the OpenCL device 14, transfer result data of the arithmetic processing from the memory space of the OpenCL device 14 to the host 12.

A configuration of the OpenCL device 14 including the memory space is described with reference to FIG. 18. FIG. 18 is a diagram where reference symbols are added to FIG. 3.3 in Non Patent Literature 1. As described earlier, the OpenCL, device 14 includes one or more CU 16 and each CU 16 includes one or more PE 18.

In the execution of the kernel in Step 2 described above, access to four different memories can be made in the OpenCL device 14. The four memories are: a private memory 20, a local memory 22, a global memory 32, and a constant memory 34. First, those four memories are described on the basis of items and work groups with reference to FIG. 19. Note that FIG. 19 is Table 3.1 in Non Patent Literature 1.

The private memory 20 corresponds to one item and used only for execution of the item. A variable that is defined for the private memory 20 corresponding to one item cannot be used for another item.

The local memory 22 corresponds to one group and can be shared by the items in the group. Thus, an example of use of the local memory 22 is to allocate a variable shared by the items in the group to the local memory 22.

The global memory 32 and the constant memory 34 can be accessed by all items in all groups. Note that, although the global memory 32 can be accessed for both read and write by items, the constant memory 34 can be accessed only for read by items. Hereinafter, the global memory 32 and the constant memory 34 are referred to collectively as a device memory 30.

From one-to-one correspondence between an item and the PE 18, the correspondence between the above-described four memories and the CU 16 and the PE 18 is as follows.

The private memory 20 corresponds one-to-one with the PE 18 and can be accessed only by the corresponding PE 18.

The local memory 22 corresponds one-to-one with the CU 16 and can be accessed by all PE 18 in the corresponding CU 16.

The device memory 30 can be accessed by all PE 18 in all CU 16, which are all PE in the OpenCL device 14.

Further, depending on the OpenCL device 14, there is a case where a cache 24 that functions as a cache memory of the device memory 30 is further provided.

As described above, a plurality of memories in different hierarchies are included in the OpenCL device 14. Those memories can be accessed by the PE at a higher speed as they are in the higher level. The hierarchical level increases in order of the device memory 30 (lowest), the local memory 22 (intermediate) and the private memory 20 (highest), and the access speed from the PE becomes higher in this order.

In order to fully bring out the performance of the OpenCL device 14, it is necessary to contrive a scheme for movement of data between the device memory 30 and the private memory 20/the local memory 22, such as referring to frequently used data after moving it to a high-speed memory space, for example.

In the case of a serial processor that is different in control method from the OpenCL device, movement of data between the global memory space and the private memory space is also performed. This is described with reference to an example of a serial processor shown in FIG. 20.

A serial processor 50 shown in FIG. 20 includes a PE 52, which is a processing element, a private memory 54, a global memory 56, and a cache control mechanism 58.

As shown therein, the storage device of the serial processor 50 is divided into the private memory 54 and the global memory 56. The private memory 54 is a low-capacity memory that is physically on-chip, and the global memory 56 is a high-capacity memory that is physically off-chip.

Although the storage device is divided into the private memory 54 and the global memory 56 in the serial processor 50, data movement between the private memory 54 and the global memory 56 is automatically done by the cache control mechanism 58 placed between the private memory 54 and the global memory 56, and a user of the serial processor 50 sees it as one large memory space. In other words, a user of the serial processor 50 can easily develop a user program for the PE 52 to perform arithmetic processing without considering how data moves between the global memory 56 and the private memory 54.

In a parallel processor, particularly the one including a large umber of cores (PE) as the OpenCL device 14 shown in FIG. 18, the same number of private memories 20 as the number of cores exist, and further the same number of local memories 22 as the number of CU 16 exist. It is generally not feasible to manage those memories all together by one cache control mechanism due to high hardware costs.

On the other hand, without the cache control mechanism, a plurality of memory spaces are seen to a user of the OpenCL system 10 (which is hereinafter referred to simply as "user"). As described earlier, in order to bring out the better performance by a scheme such as referring to frequently used data after moving it to a high-speed memory space (which is, a higher-hierarchy memory space), it is necessary to explicitly indicate by a user program movement of data between memories in different hierarchies that is involved in arithmetic processing. To achieve this correctly, a user needs to have knowledge about differences in speed, capacity, function and the like among the above-described memories. A specific example is described with reference to FIG. 21.

FIG. 21 is a diagram illustrating the case of executing arithmetic processing to obtain data blocks A' and B' from a plurality of data blocks (data blocks A to D). Note that, in FIG. 21, illustration of kernel transfer from the host to the device is omitted. Further, the data blocks A to D are reference data transferred from the host 12 to the OpenCL device 14 in the above-described Step 1 and stored in the global memory 32. The data blocks A' and B' are a result of arithmetic processing performed on the data blocks A to D in the above-described Step 2 and written into the global memory 32 and then transferred to the host 12 in the above-described Step 3.

The processing of Step 2, which is arithmetic processing to execute the kernel, is described hereinbelow. Note that, in this specification, in the case where there can be a plurality of private memories, they are referred to as "private memory group".

If the performance of arithmetic processing is not pursued, a technique of using only the global memory 32 without using the private memory group/the local memory 22 in arithmetic processing can be employed. In this case, there is no data transfer between the global memory 32 and the private memory group/the local memory 22.

This technique is simple to control but not good in performance. In order to achieve the better performance of arithmetic processing, a technique of performing arithmetic processing after transferring data to be processed from the global memory 32 to the private memory group/the local memory 22 and then transferring a result of the arithmetic processing to the global memory 32 after storing it into the private memory group/the local memory 22 is employed as described above.

For the case of using this technique, a procedure (Steps A to C) when all items can be simultaneously executed in parallel is described first. Note that "all items can be simultaneously executed in parallel" means that the number of PE is equal to or more than the total number of items, and the capacity of the private memory group and the local memory is capable of storing all the data to be processed and, in this case, transfer of data to be processed from the global memory 32 to the private memory group/the local memory 22, parallel execution of arithmetic processing by each PE 18, transfers of a processing result from the private memory group/the local memory 22 to the global memory 32 are performed only once.

<Step A>: Transfer the data blocks A to D stored in the global memory 32 to the private memory group/the local memory 22.

This transfer is to transfer data used only by the PE 18 among the data to be processed to the private memory of the PE 18 and transfer data shred by a plurality of PE 18 to the local memory 22, for example.

Note that the data transfer from the global memory 32 to the private memory group/the local memory 22 is referred to hereinafter as "read transfer". Further, the data block that is read-transferred such as the data blocks A to D is referred to as "read block RB".

<Step B>: Execute arithmetic processing on each PE 18 and store a result of the arithmetic processing into the private memory/the local memory 22 that can be accessed by the PE 18.

<Step C>: Transfer the data blocks A' and B' obtained by the arithmetic processing in Step B and stored in the private memory group/the local memory 22 to the global memory 32.

Note that the data transfer from the private memory group/the local memory 22 to the global memory 32 is referred to hereinafter as "write transfer". Further, the data block that is stored in the private memory group/the local memory 22 and write-transferred such as the data blocks A' and B' is referred to as "write block WB".

All of the three steps need to be explicitly specified in the kernel created by a user. This specification includes the content of arithmetic processing and the content depending on the configuration of the OpenCL device 14 (the number of PE (=the number of private memories), the capacity of each private memory, the capacity of the local memory etc.).

For example, in the case where there are a plurality of read blocks RB to be processed and each of the read blocks RB needs to be segmented into sub-blocks because all of them cannot be stored in the private memory group/the local memory 22 in one work group, it is necessary to specify an association method between sub-blocks for the plurality of read blocks RB in Step. A. The "association method" between sub-blocks of the read blocks RB means which sub-blocks of the read block RB among the sub-blocks of the plurality of read blocks RB are to be transferred to the private memory group in the same work group or the local memory 22 in same one work group. This depends on the content of arithmetic processing, and the way of segmenting them depends on the configuration of the OpenCL device 14.

Likewise, in the case where there are a plurality of write blocks WB as a result of arithmetic processing, it is also necessary to specify an association method in the meaning of under what combination of the sub-blocks of the read block RB the respective sub-blocks of the plurality of write blocks WB are obtained as a processing result. Note that the content of each sub-block in the write block WB is data stored as a processing result in the private memory group or the local memory 22 of each work group. The transfer of the write blocks WB to the global memory 32 means to write the data into each sub-block position of the write blocks WB in the global memory 32. Just like the association method of the read blocks RB, the association method of the write blocks WB also depends on the content of arithmetic processing and the configuration of the OpenCL device 14.

Besides the case where all of desired data blocks cannot be stored in the memory in the work group as described above, in the case where the total number of PE is smaller than the size of the index space, for example, all items cannot be simultaneously executed in parallel and therefore parallel execution of items by the PE needs to be repeated a plurality of times. As a matter of course, the read transfer and the write transfer also need to be repeated as the parallel execution is repeated. In this case, it is necessary to specify the segmentation method of the data blocks and the association method of sub-blocks obtained by diving the data blocks in accordance with the content of arithmetic processing and the configuration of the OpenCL device 14.

The "segmentation method" of a data block means how to segment the data block into sub-blocks. The "sub-block SB" is a unit of read transfer and write transfer. Hereinafter, when it is necessary to distinguish between read and write, the sub-blocks obtained by segmenting the read block RB is referred to as "sub-read blocks SRB", and the sub-blocks obtained by segmenting the write block WB is referred to as "sub-write blocks SWB".

The "association method" between sub-blocks SB means which sub-blocks SB included in different read blocks or write blocks are to reside in the same private memory group or in the same local memory 22 at the same time.

The segmentation method of a data block depends on the configuration of the OpenCL device 14, and the association method of sub-blocks depends on the content of arithmetic processing. The specification is more complicated when the segmentation is necessary compared with when a data block is not segmented.

FIG. 22 shows the description that needs to be specified by a user in order to cause the OpenCL device 14 to perform arithmetic processing.

As shown in FIG. 22, the first part is specifications for read transfer, and it includes a part depending on the content of arithmetic processing and the configuration of the OpenCL device 14.

The part depending on the content of arithmetic processing and the configuration of the OpenCL device 14 is a specification whether to segment the read block RB (example 1), a specification of the segmentation method when segmenting the read block RB (example 2), and a specification of the association method between the sub-read blocks SRB (example 3).

The second part is specifications of arithmetic processing on the read block RB or the sub-read block SRB. Because this part specifies arithmetic processing, it depends on the content of arithmetic processing as a matter of course. Further, because this part needs to conform to the specifications for read transfer, it contains the content depending on the configuration of the OpenCL device 14, such as a specification of the number of times of parallel execution of items (example 4).

The third part is specifications for write transfer, and it includes a part depending on the content of arithmetic processing and the configuration of the OpenCL device 14 (example 5) by necessity because it needs to conform to the specifications for read transfer.

As described above, in order to pursue the better performance, a user needs to develop the kernel (user code) in accordance with the content of arithmetic processing and the configuration of the OpenCL device 14.

However, even devices in conformity to OpenCL are different in the capacity of each memory space, the access speed, the access delay, the presence or absence of cache control and the like if manufacturers are different. Therefore, there is a possibility that a user code that is ideally developed for movement of data between memories in different hierarchies for a certain OpenCL device causes degradation of performance for another OpenCL device or an OpenCL device of a different generation in the same series. Thus, the portability in performance of a user code is low.

A certain degree of performance portability can be realized by creating a user code with the configurations of many types of existing OpenCL devices in mind, rather than developing a user code for a specific OpenCL device. However, this work gives a large burden on those who design arithmetic processing because it is not essential work and further causes a decrease in code legibility, an increase in complication and the like.

Patent Literature 1 (Japanese Unexamined Patent Application Publication No. 2013-025547) discloses a technique for reducing a burden on a user code developer and enhance the portability of a user code for movement of data between a plurality of memories in different hierarchies involved in arithmetic processing on the OpenCL device.

In this technique, a developer of a user code sets an attribute group containing a plurality of attributes for each of data blocks (read block and write block) to be processed and as a result of processing in the OpenCL device as arguments of the kernel, and a processing control unit of the OpenCL device automatically determines a transfer method based on the attribute group of each data block to be processed and as a result of processing indicated by the arguments of the kernel transferred from the host and parameters indicating the configuration of the OpenCL device and then controls transfer of data with the determined transfer method and arithmetic processing by the OpenCL device.

Note that the transfer method mainly relates to how to transfer data blocks between the device memory and the local memory and the private memory.

FIG. 23 shows the description that needs to be specified by a user when developing the kernel in the OpenCL device to which the technique of Patent Literature 1 is applied. As shown in FIG. 23, the description includes a specification of the attribute group and a specification of user processing only, both of which do not depend on the device configuration.

As shown in FIG. 23, the attribute group is classified into groups of a unique attribute, an arithmetic attribute and a policy attribute, and the attribute of each group is required to determine the transfer method and does not depend on the configuration of the OpenCL device. For example, the policy attribute includes an allocation attribute indicating whether to segment the data block into a plurality of sub-blocks and transfer the sub-blocks and a segmentation method when segmenting it, a margin attribute indicating the size of data neighboring sub-blocks that is transferred together with the sub-blocks when segmenting the data block into a plurality of sub-blocks and transferring the sub-blocks, and a dependence attribute indicating whether the sub-blocks have dependence with other neighboring sub-blocks when segmenting the data block into a plurality of sub-blocks and transferring the sub-blocks and indicating all dependence directions when there is dependence.

Note that the attribute group of the write clock is set on the assumption that the write block already exists in the local memory or the private memory and is transferred to the device memory.

According to the technique disclosed in Patent Literature 1, a developer of a user code (kernel) can implement the high-performance kernel with high portability simply by specifying the attribute group for each data block used by the kernel, without knowing the configuration of the OpenCL device. An arithmetic control unit of the OpenCL device can perform control to segment the data block into the size most suitable for the device based on the attribute group of each data block referred to by the kernel and the configuration of the OpenCL device and repeat the repetitive processing of "read transfer→arithmetic processing by the kernel→write transfer" the number of times equal to the number of segments. The arithmetic control unit of the device may be designed by an expert having a good knowledge of the configuration of the OpenCL device, which is a developer in the manufacturer of the OpenCL device, for example.

SUMMARY

Consider the case where two kernels that are executed in succession are related to each other. For example, it is assumed that the first kernel X is executed first, and the data block as a processing result is used as input data of the second kernel Y that is executed after that. Note that each data block is transferred by being segmented into sub-blocks.

In the case of the OpenCL device disclosed in Patent Literature 1 (Japanese Unexamined Patent Application Publication No. 2013-025547), the procedure is considered to be as follows.

<Step X1>

The host transfers the first kernel X to the device. The arguments of the first kernel X include the above-described attribute group for each data block (read block) used for arithmetic processing by the first kernel X.

<Step X2>

The arithmetic control unit of the device determines a transfer method including a segmentation method of each of the read blocks stored in the global memory and the write block as a processing result based on the arguments of the first kernel X. Then, it segments each read block into sub-read blocks and transfers them to the local memory or the private memory and causes the PE to perform arithmetic processing.

<Step X3>

Each PE in the device performs arithmetic processing according to control by the arithmetic control unit and obtains sub-write blocks. The sub-write blocks are stored in the local memory or the private memory and then transferred from the PE to the global memory according to control by the arithmetic control unit.

<Step X4>

The processing of Steps X2 and X3 is repeated under control of the arithmetic control unit until all of the processing are done. Finally, the data block (write block) as a processing result of the first kernel X is obtained and stored into the global memory.

After the processing of the first kernel X is completed, the processing of the second kernel Y is performed as follows.

<Step Y1>

The host transfers the second kernel Y to the device. The arguments of the second kernel Y include the above-described attribute group for each of the data block (read block) used for arithmetic processing by the second kernel Y.

In the case where a certain write block in the write blocks of the first kernel X is used for arithmetic processing of the second kernel Y, the attribute group is specified also for the read block of the second kernel Y corresponding to the write block in the arguments of the second kernel Y.

Hereinafter, the data block that is the write block of the kernel executed first and that serves as the read block of the kernel executed subsequently is referred to as "continuous write block" and the data block that is the read block of the kernel executed subsequently and that serves as the write block of the kernel executed first is referred to as "continuous read block".

<Step Y2>

The arithmetic control unit of the device determines a transfer method including a segmentation method of each of the read blocks (including the continuous read block) stored in the global memory and the write block as a processing result based on the arguments of the second kernel Y. Then, it segmentes each read block into sub-read blocks and transfers them to the local memory or the private memory and causes the PE to perform arithmetic processing.

<Step Y3>

Each PE in the device performs arithmetic processing according to control by the arithmetic control unit and obtains sub-write blocks. The sub-write blocks are stored into the local memory or the private memory and then transferred from the PE to the global memory according to control by the arithmetic control unit.

<Step Y4>

The processing of Steps Y2 and Y3 is repeated under control of the arithmetic control unit until all of the processing are done. Finally, the data block (write block) as a processing result of the second kernel Y is obtained and stored into the global memory.

As in the above procedure, when the continuous write block exists, transfer (write transfer) of sub-write blocks of the continuous write block to the global memory and transfer (read transfer) of sub-read blocks of the continuous read block corresponding to the continuous write block to the local memory/the private memory are performed.

If the sub-write blocks of the continuous write block can be used for the next kernel as the sub-read blocks already transferred by read transfer to the private memory/the local memory, the write transfer and the read transfer can be reduced by using the continuous write block for the next kernel without transferring it from the local memory/the private memory to the global memory, and it is possible to improve the processing efficiency of the OpenCL device.

The other problems and novel features of the present invention will become apparent from the description of the specification and the accompanying drawings.

One embodiment is an arithmetic control method that controls parallel arithmetic by a plurality of processing elements in an OpenCL device and includes a first step and a second step.

A first step is a step of acquiring and storing an attribute group set for each of one or more read blocks stored in a memory in a lowest hierarchy (for example, a global memory) of an OpenCL device and one or more write blocks transferred from a memory in a different hierarchy (for example, a private memory or a local memory) to the memory in the lowest hierarchy.

A second step is a step of determining a transfer method of each of the read block and the write block based on each of the attribute group stored in the first step and a configuration parameter indicating a configuration of the OpenCL device, and performing transfer of the read block and the write block according to the determined transfer method and control of the parallel processing corresponding to the transfer.

The read block is a data block that is transferred from the memory in the lowest hierarchy to the memory in the different hierarchy as data to be used for the parallel processing. The write block is a data block that is transferred from the memory in the different hierarchy to the memory in the lowest hierarchy after the parallel processing as a result of the parallel processing on the one or more read blocks.

The attribute group includes a plurality of attributes that are required for determining the transfer method and not depending on the configuration of the OpenCL device, and it includes an allocation attribute, a margin attribute and a dependence attribute, for example.

The allocation attribute indicates whether to segment the data block into a plurality of sub-blocks and transfer the sub-blocks and indicates a segmentation method when segmenting the data block.

The margin attribute indicates a size of data neighboring the sub-blocks transferred together with the sub-blocks when segmenting the data block into a plurality of sub-blocks and transferring the sub-blocks.

The dependence attribute indicates whether the sub-blocks have dependence with other neighboring sub-blocks when segmenting the data block into a plurality of sub-blocks and transferring the sub-blocks and indicates all dependence directions when there is the dependence.

Note that the attribute group of the write block is set based on an assumption that the write block already exists in the memory in the different hierarchy and is transferred to the memory in the lowest hierarchy.

The second step further includes, when a first kernel and a second kernel are executed in succession in the OpenCL device, the write block of parallel processing corresponding to the first kernel includes a continuous write block used as the read block of parallel processing corresponding to the second kernel, and the allocation attribute of the continuous write block set for the first kernel and the allocation attribute of the read block (continuous read block) corresponding to the continuous write block set for the second kernel are the same, a step of performing pipelining control that executes the first kernel and the second kernel in a pipeline by using the continuous write block for execution of the second kernel through the memory in the different hierarchy without transferring the continuous write block to the lowest hierarchy.

In the pipeline control step, the margin attribute and the dependence attribute of the read block corresponding to the continuous write block set for the second kernel are respectively logically added to the margin attribute and the dependence attribute set for the read block for each of the read block corresponding to the first kernel.

Note that the implementation of the method according to the above-described embodiment as a device or a system, an OpenCL device that executes the method, a program causing a computer to execute the method and the like are also effective as aspects of the present invention.

According to the above-described embodiment, it is possible to improve the processing efficiency of the OpenCL device.

BRIEF DESCRIPTION OF THE DRAWINGS

The above and other aspects, advantages and features will be more apparent from the following description of certain embodiments taken in conjunction with the accompanying drawings, in which:

FIG. 9 is a diagram showing an example of an attribute group set for each of the data blocks shown in FIG. 2.

FIG. 10 is an example of parameters indicating a configuration of an arithmetic unit in the OpenCL system shown in FIG. 1.

FIG. 12 is a diagram showing a part of a description determined by a scenario determination unit on the example shown in FIG. 2.

FIG. 19 is a diagram illustrating each memory in an OpenCL device.

FIG. 22 is another diagram illustrating a problem addressed by the technique disclosed in Patent Literature 1.

FIG. 23 is a diagram showing a description that needs to be specified by a user in an OpenCL device in Patent Literature 1.

DETAILED DESCRIPTION

Figure 1:
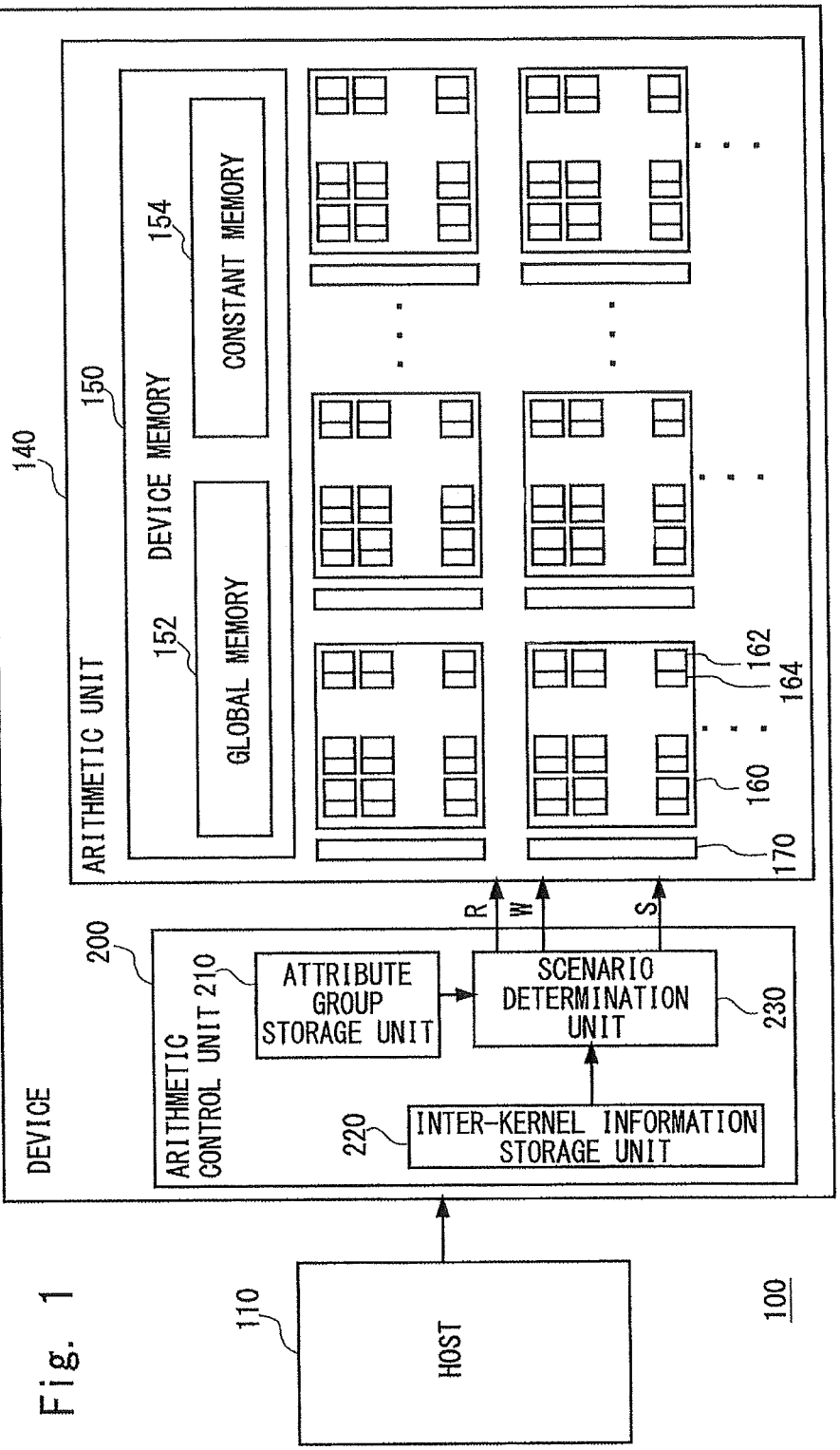
FIG. 1 is a diagram showing an OpenCL system according to one embodiment.

Exemplary embodiments of the present invention will be explained hereinbelow with reference to the drawings. The following description and the attached drawings are appropriately shortened and simplified to clarify the explanation. Further, elements that are shown as functional blocks for performing various kinds of processing in the drawings may be configured by a CPU, memory or another circuit as hardware or may be implemented by a program loaded to memory or the like as software. It would be thus obvious to those skilled in the art that those functional blocks may be implemented in various forms such as hardware only, software only or a combination of those, and not limited to either one. Note that, in the drawings, the same elements are denoted by the same reference symbols and redundant description thereof is omitted as appropriate.

Further, the above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

FIG. 1 shows an OpenCL system 100 according to one embodiment. The OpenCL system 100 includes an OpenCL host (which is hereinafter referred to simply as "host") 110 and an OpenCL device (which is hereinafter referred to simply as "device") 120.

The device 120 includes an arithmetic control unit 200 and an arithmetic unit 140. The arithmetic control unit 200 includes an attribute group storage unit 210, an inter-kernel information storage unit 220 and a scenario determination unit 230. The arithmetic unit 140 includes a device memory 150, a plurality of compute units (CU) 160, and a local memory 170 provided for each CU 160.

The device memory 150 includes a global memory 152 and a constant memory 154. Each CU 160 includes a plurality of PE 162 and a private memory 164 provided for each PE 162.

Note that the global memory 152, the constant memory 154, the CU 160, the PE 162, the private memory 164 and the local memory 170 are the same as those of the same name in the normal OpenCL device, and detailed description thereof is omitted.

When the host 110 causes the device 120 to perform arithmetic processing, it transfers a kernel corresponding to the arithmetic processing where arguments are specified by a user to the device 120.

In the device 120, the inter-kernel information storage unit 220 stores information indicating dependence of data blocks between a plurality of kernels to be executed in succession (which is referred to as "inter-kernel data block dependence information"). This information may be input to the inter-kernel information storage unit 220 directly by a user or may be transferred together with one kernel (for example, the kernel to be executed first) of the plurality of kernels by being contained in the arguments of the kernel from the host 110 to the device 120 and then stored into the inter-kernel information storage unit 220.

The inter-kernel data block dependence information indicates whether the write block of the kernel executed first includes the one used as the read block of the kernel executed subsequently and, when there is the one, indicates correspondence between the continuous write block and the continuous read block, for example.

Note that, in the case of a single kernel, the inter-kernel data block dependence information indicates "no dependence". The single kernel means a kernel that is not related to another kernel, and a read block to be processed by the kernel is not a write block as a processing result of another kernel, and a write block of the kernel is not used as a read block of another kernel.

The arithmetic control unit 200 controls the arithmetic unit 140 based on the arithmetic content indicated by the kernel from the host 110, each of the attribute group stored in the attribute group storage unit 210 and the inter-kernel data block dependence information stored in the inter-kernel information storage unit 220. The arithmetic unit 140 performs arithmetic processing according to control of the arithmetic control unit 200 and obtains a processing result. The arithmetic processing performed by the arithmetic unit 140 involves transfer of data to be processed from the device memory 150 to the private memory 164/the local memory 170 (read transfer) and transfer of data of a processing result to the device memory 150 (write transfer).

Because both of the data to be processed and the data of a processing result are generally stored in the global memory 152, the following description is based on the assumption that "read transfer" and "write transfer" are transfer between the global memory 152 and the private memory 164/the local memory 170. Note that, in the case where the data to be processed is stored in the constant memory 154, "read transfer" includes transfer from the constant memory 154 to the private memory 164/the local memory 170.

<In the Case of Single Kernel>

For better understanding, the case of executing a single kernel is described with reference to a specific example shown in FIG. 2.

In this case, the inter-kernel data block dependence information indicating "no dependence" is stored in the inter-kernel information storage unit 220. The processing in the OpenCL system 100 is the same as the processing in the OpenCL system disclosed in Patent Literature 1.

The term "dimension" in the following description corresponds to the dimension of the index space described above. Although three dimensions can be specified at maximum for the index space in OpenCL, two dimensions are used as an example for convenience of description.

Figure 2:
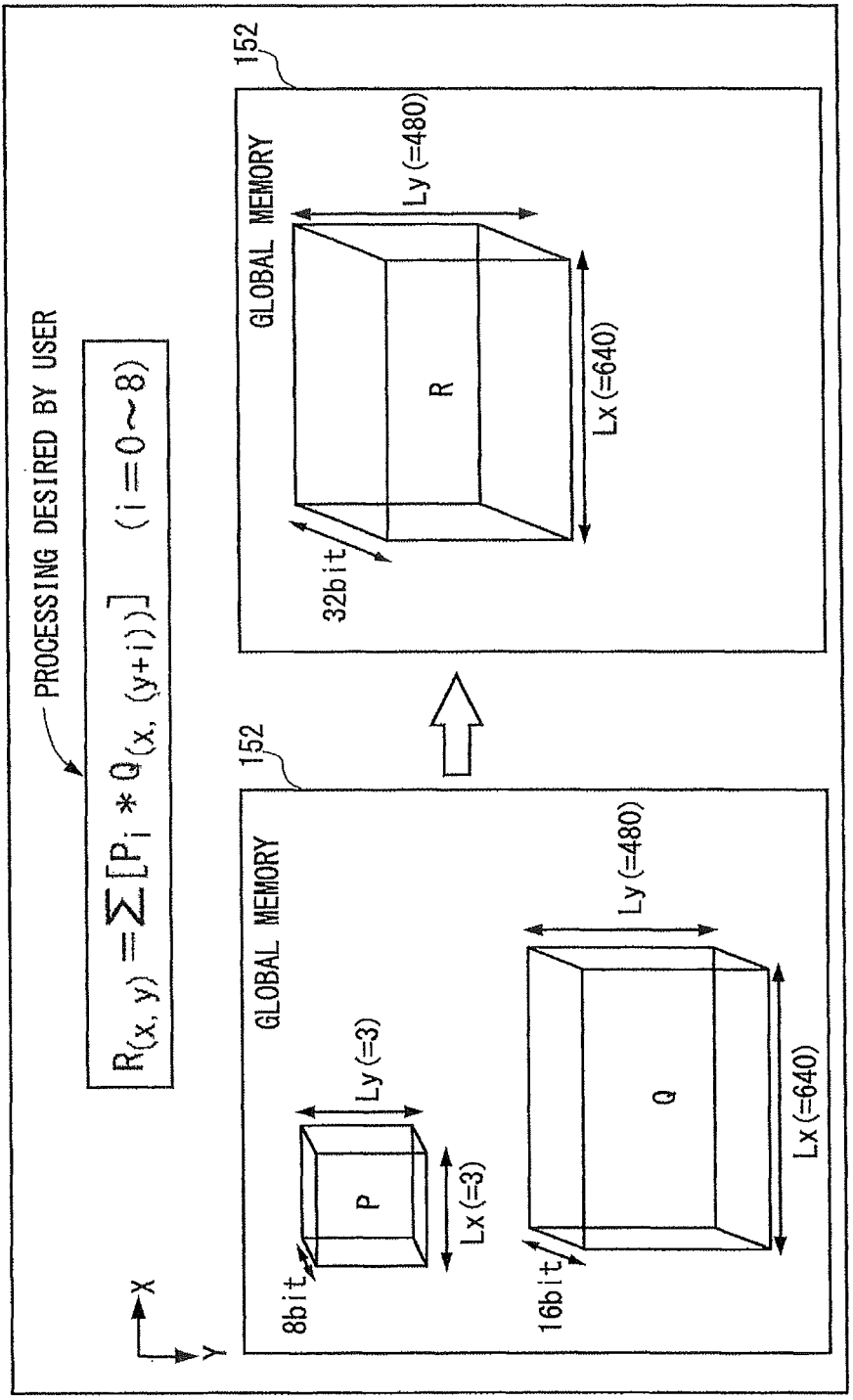
FIG. 2 is a diagram showing a specific example illustrating a case of a single kernel.

As shown in FIG. 2, processing desired by a user is processing represented by the following equation (1).

$$R_{(x,y)} = \Sigma [P_i * Q_{(x,(y+i))}] (i=0\sim8)$$

Data to be processed is each data contained in a read block P and a read block Q. Data of a processing result is each data contained in a write block R. In the example of FIG. 2, there is only one write block R.

The kernel for implementing the processing represented by the equation (1) is created by a user as a matter of course. The creation of the kernel includes processing of creating a program code executed by each PE 162 of the device 120 (which is referred to hereinafter "user specification processing") and processing of specifying arguments.

In the OpenCL system 100 according to this embodiment, "attribute group" including eight attributes is supported in addition to the arguments defined in OpenCL. Those eight attributes are: "size attribute", "read attribute", "write attribute", "margin attribute", "broadcast attribute", "allocation attribute", "hierarchy attribute" and "dependence attribute", which are specified by a user for all read blocks and write blocks as the arguments of a kernel. Note that, when specifying attributes, it is not always necessary to specify all of the eight attributes.

The eight attributes included in the attribute group are parameters that need to be referred to in order to determine a method of transfer between the global memory 152 and the private memory 164 and/or the local memory 170 (transfer method). Hereinafter, "transfer" means transfer between the global memory 152 and the private memory 164 and/or the local memory 170 unless particularly described.

The "transfer method" includes the followings.

(1) Transfer Method 1: Presence or Absence of Segmentation

The transfer method 1 is either one of "no segmentation" method or "segmentation" method.

For a read block, "no segmentation" means to transfer all data in the read block by one-time read transfer, and "segmentation" means to segment the read block into a plurality of sub-read blocks SRB and transfer only one sub-read block SRB to one work group by one-time read transfer.

For a write block, "no segmentation" means to transfer all data (processing result) in the write block to the global memory 152 by one-time write transfer, and "segmentation" means to segment the write block into a plurality of sub-write blocks SWB and transfer only one sub-write block SWB from one work group by one-time write transfer.

(2) Transfer Method 2: Segmentation Method

The transfer method 2 means how to segment the data block into a plurality of sub-blocks.

(3) Transfer Method 3: Allocation Method (Association Method of Sub-Read Blocks SRB)

The transfer method 3 is specified when the above-described transfer method 1 is "segmentation" on the read block.

Specifically, the allocation method indicates how to allocate each sub-read block SRB from each read block transferred by one-time read transfer to the private memory 164/the local memory 170 when there are a plurality of read blocks. When, on the other hand, there is only one read block, the allocation method is to allocate the sub-read block SRB equally to the private memory 164/the local memory 170.

(4) Transfer Method 4: Integration Method (Association Method of Sub-Write Blocks SWB)

The transfer method 4 is specified when the above-described transfer method 1 is "segmentation" on the write block.

Note that "integration" means to write to a region allocated to each sub-write block SWB of the write block in the global memory 152.

The integration method indicates, when there are a plurality of write blocks, how to integrate a plurality of sub-write blocks SWB transferred by one-time write transfer and stored in the private memory group/the local memory 170 into the respective write blocks. When there is only one write block, the integration method is a method of integrating data of each sub-write block SWB of the write block stored in the private memory group/the local memory 170 into the one write block.

The above-described "transfer method" needs to be specified by a user code in the existing system. However, the user code is complicated because it depends on the content of arithmetic processing and the configuration of the device 120 (specifically, the arithmetic unit 140), and it is extremely difficult to maintain portability.

On the other hand, the OpenCL system 100 according to this embodiment divides processing into processing depending on the configuration of the OpenCL device and processing not depending on it, and determines the processing depending on the OpenCL device automatically based on parameters specified by the processing not depending on the OpenCL device and parameters indicating the configuration of the OpenCL, though in the existing system each user has taken time for the processing to determine the transfer method in an impromptu manner each time in consideration of both of the content of arithmetic processing and the configuration of the OpenCL device.

To be specific, in the OpenCL system 100 according to this embodiment, processing not depending on the OpenCL device corresponds to the specification of the above-described attribute group on the data block. Although the attributes in the attribute group are parameters required for determining the transfer method, they do not depend on the configuration of the OpenCL. This is described hereinafter in detail. Note that, in the following description, the statement that each attribute is "required for determining the transfer method but does not depend on the configuration of the OpenCL" is not repeated, and only the elements different from this are described.

The above-described eight attributes are further classified into three types: "unique attribute", "arithmetic attribute" and "policy attribute". They are described hereinafter with reference to the example of the data blocks shown in FIG. 2.

The "unique attribute" is an attribute that is not related to the content of arithmetic processing and the user's intention and unique to the data block. In this embodiment, the "unique attribute" is "size attribute" described below.

<Size Attribute>

This attribute is a parameter indicating the size of the data block, which is the number of words for each dimension and the number of bytes or the number of bits for each word, for example. This attribute is specified for all data blocks by necessity.

Thus, the size attributes of the read block P, the read block Q and the write block R are as follows.

The read block P is a two-dimensional data block, and the X-direction size Lx and the Y-direction size Ly are both three words. Note that, in the read block P, the number of bits of one word is eight bits. Therefore, for the read block P, "X-direction size Lx:3, Y-direction size Ly:3, the number of bits/word: 8" is specified as the size attribute.

Likewise, for the read block Q, "X-direction size Lx:640, Y-direction size Ly:480, the number of bits/word: 16" is specified.

Further, for the write block R, "X-direction size Lx:640, Y-direction size Ly:480, the number of bits/word: 32" is specified.

The "arithmetic attribute" is an attribute that is not related to the user's intention but related to the content of arithmetic processing. In this embodiment, the "arithmetic attribute" includes "read attribute" and "write attribute" described below. The arithmetic attribute is specified on the assumption that each data block is segmented into one or more sub-blocks. For the write block, an additional assumption that the read block is already present on the private memory group/the local memory is further added. Note that "the data block is segmented into one sub-block" means that it is not segmented.

<Read Attribute>

This attribute indicates whether the data block is data to be processed (i.e. data to be read-transferred) and, when it is data to be processed, indicates the order of transfer. The order of transfer is a parameter that specifies in what order the sub-blocks of the data block are to be transferred.

Because the write block is not read-transferred, "NONE" indicating no read transfer is specified. Because the read block is a data block that is read-transferred, the order of transfer is specified for read transfer.

In the OpenCL system 100 according to this embodiment, as the order of transfer that is set as the read attribute, "TOP LEFT", "BOTTOM RIGHT" and "RANDOM" can be specified. Note that, only when "RANDOM" is specified, a pointer to an area that stores information indicating the order of transfer is specified in addition.

Figure 3:
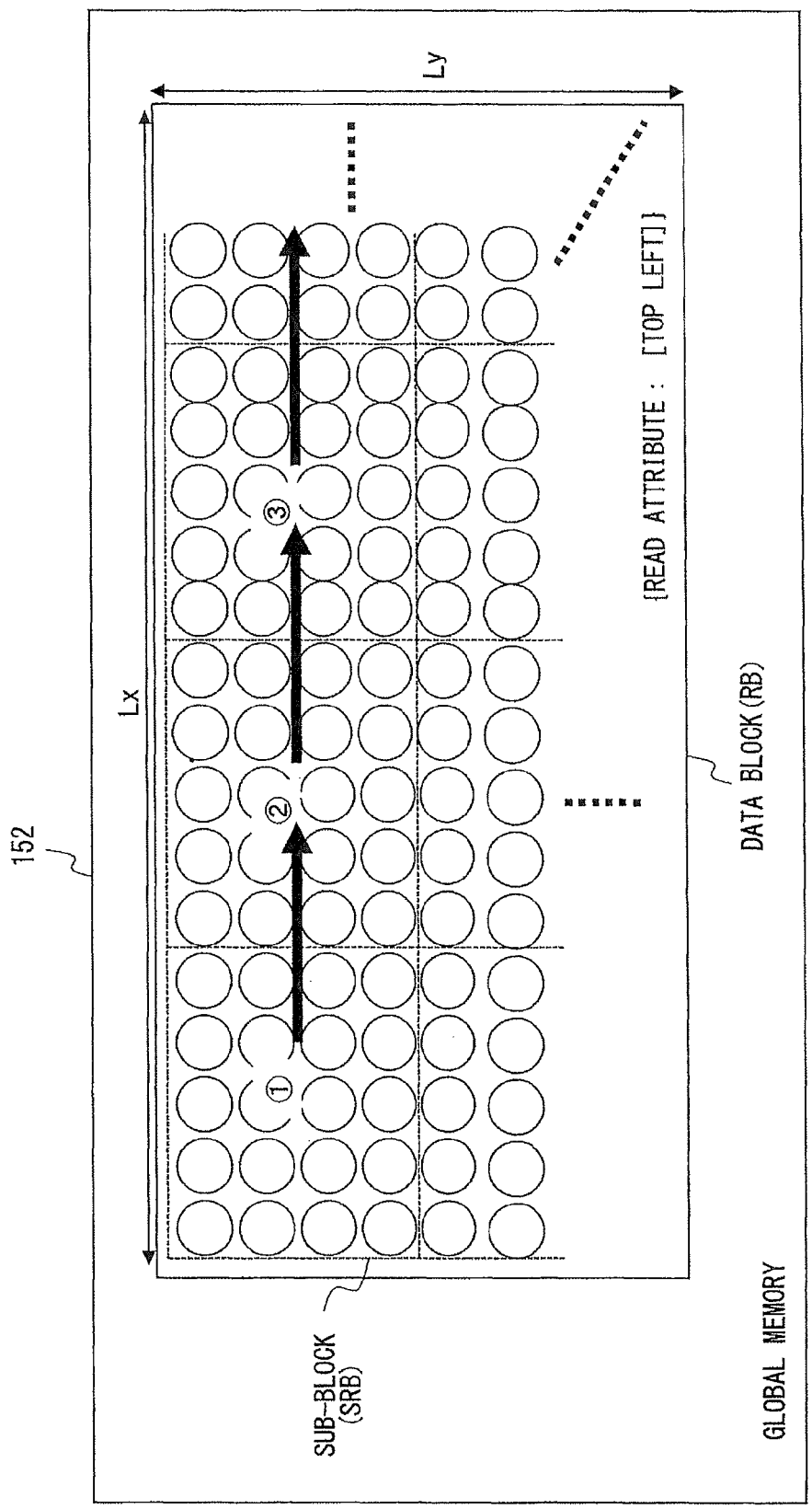
FIG. 3 is a diagram illustrating a read attribute.

"TOP LEFT" indicates to transfer data from the top-left sub-block, and "BOTTOM RIGHT" indicates to transfer data from the bottom-right sub-block. FIG. 3 shows the order of transfer of sub-blocks when "TOP LEFT" is specified as the read attribute.

As shown in FIG. 3, in this case, in the data block (read block) stored in the global memory 152, the order of transfer is: the sub-block 1 at the top left, the sub-block 2 on the right of the sub-block 1, the sub-block 3 on the right of the sub-block 2, and so on.

The read attribute of the data blocks shown in FIG. 2 is described hereinafter.

Based on the content of arithmetic processing represented by the equation (1), because the read block P and the read block Q are data to be read-transferred, the order of transfer "TOP LEFT" is specified as the read attribute.

On the other hand, because the write block R is not data to be read-transferred, "NONE" is specified as the read attribute.

<Write Attribute>

This attribute indicates whether the data block is data as a result of arithmetic processing (i.e. data to be write-transferred) and, when it is processing result data, indicates the order of transfer. The order of transfer is a parameter that specifies in what order the sub-write blocks SWB are to be transferred.

Because the read block is not write-transferred, "NONE" indicating no write transfer is specified. Because the write block is a data block that is write-transferred, the order of transfer is specified for write transfer.

In the OpenCL system 100 according to this embodiment, as the order of transfer that is set as the write attribute, "TOP LEFT", "BOTTOM RIGHT" and "RANDOM" can be specified. Note that, only when "RANDOM" is specified, a pointer to an area that stores information indicating the order of transfer is specified in addition.

Because the read block is not write-transferred, "NONE" indicating no write transfer is specified. Therefore, "NONE" is specified as the write attribute in the read block P and the read block Q shown in FIG. 2.

Because the write block is a data block that is write-transferred, the order of transfer is specified for write transfer. The order of transfer is a parameter that specifies in what order the sub-write blocks of the data block are to be transferred.

In the OpenCL system 100 according to this embodiment, as the order of transfer that is set as the write attribute, "TOP LEFT", "BOTTOM RIGHT" and "RANDOM" can be specified, just like the order of transfer that is set as the read attribute. Only when "RANDOM" is specified, a pointer to an area that stores information indicating the order of transfer is specified in addition.

The meaning of each parameter of the order of transfer set as the write attribute is the same as the corresponding parameter of the order of transfer set as the read attribute, and thus detailed description thereof is omitted.

The write attribute of the data blocks shown in FIG. 2 is described.

Based on the content of arithmetic processing represented by the equation (1), because the write block R is data to be write-transferred, the order of transfer "TOP LEFT" is specified as the write attribute.

On the other hand, because the read block P and the read block Q re not data to be write-transferred, "NONE" is specified as the write attribute.

The "policy attribute" is an attribute that is related to the content of arithmetic processing and the user's intention about how to execute transfer and arithmetic processing. In the OpenCL system 100 according to this embodiment, the "policy attribute" includes "margin attribute" "broadcast attribute", "allocation attribute", "hierarchy attribute" and "dependence attribute". The policy attribute is also specified on the assumption that each data block is segmented into one or more sub-blocks. For the write block, an additional assumption that the write block is already present on the private memory 20/the local memory 22 is further added.

Note that "the data block is segmented into one sub-block" means that it is not segmented.

<Margin Attribute>

This attribute is a parameter for the read block, and it indicates the amount of data outside the sub-read block SRB that is adjacent to the border with the sub-read block SRB, and transferred together with data in the sub-read block SRB. The margin attribute is specified for each dimension. The parameter of the margin attribute is specified in units of words.

Note that, for the write block, the margin attribute cannot be specified, or ignored even if it can be specified.

Figure 4:
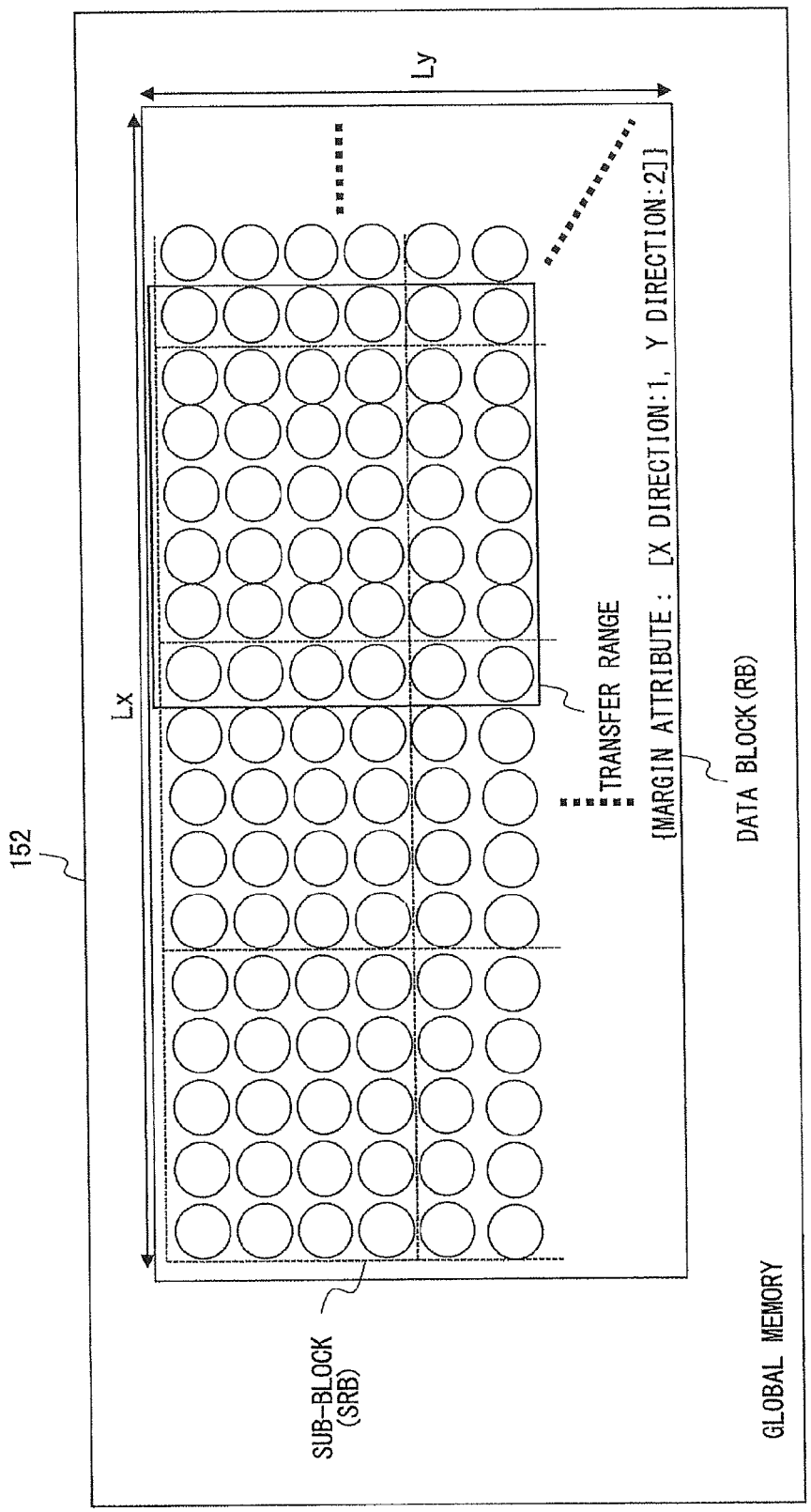
FIG. 4 is a diagram illustrating a margin attribute.

FIG. 4 shows a transfer range when transferring each sub-read block SRB of the data block (read block) in the case where "1" in the X-direction and "2" in the Y-direction are specified as the margin attribute. In this case, the transfer range when transferring each sub-read block SRB includes data of one column each adjacent to the borders on the left and right of the sub-read block SRB and data of two rows each adjacent to the borders at the upper and lower ends of the sub-read block SRB, in addition to the data in the sub-read block SRB. Note that, FIG. 4, the sub-read block SRB that is located at the top of the data block is shown as an example and there is no data that is adjacent to the upper border of the sub-read block SRB, and therefore the transfer range when transferring each sub-read block SRB does not include the data adjacent to the upper border.

As is described in detail later, in the OpenCL system 100 according to this embodiment, for each read block, one sub-read block SRB is transferred for one CU 160 by one-time read transfer, and the CU 160 performs arithmetic processing on the sub-read block SRB of each sub block transferred to the private memory/the local memory of the CU 160 by one-time read transfer. Then, a result of the arithmetic processing is transferred as one sub-block of each write block from the CU 160 to the global memory.

For example, in the case of performing 3×3 convolution processing on a two-dimensional image, in four directions (up, down, right, and left) of a target pixel, one pixel adjacent to the target pixel is required. If only data in the sub-read block SRB is transferred, it is not possible to perform arithmetic processing on each pixel located in the outermost part of the sub-read block SRB. Therefore, in this case, it is necessary to specify "1" as the margin attribute in both of the X-direction and the Y-direction.

The margin attribute of the data blocks shown in FIG. 2 is described. Note that, because specification of the margin attribute is related to specification of other attributes, it is difficult to describe the margin attribute only. Therefore, only the values of the margin attribute specified for each of the data blocks shown in FIG. 2 are described, and the details of the meaning of those values are described later.

Although the read block P and the read block Q are data for which the margin attribute is to be specified, the margin is set to "0" in both of the X-direction and the Y-direction for the read block P. Further, for the read block Q, the margin is set to "0" in the X-direction and "9" in the Y-direction.

Accordingly, at the transfer of the read block P, only data in the sub-read block SRB is transferred. On the other hand, at the transfer of the read block Q, nine rows of data adjacent to the lower end of the sub-read block SRB is transferred in addition to data in the sub-read block SRB.

Because the write block R is data to be write-transferred, the margin attribute is not specified. Thus, at the transfer of the write block R, only data in the sub-write block SWB is transferred.

<Broadcast Attribute>

Figure 5:
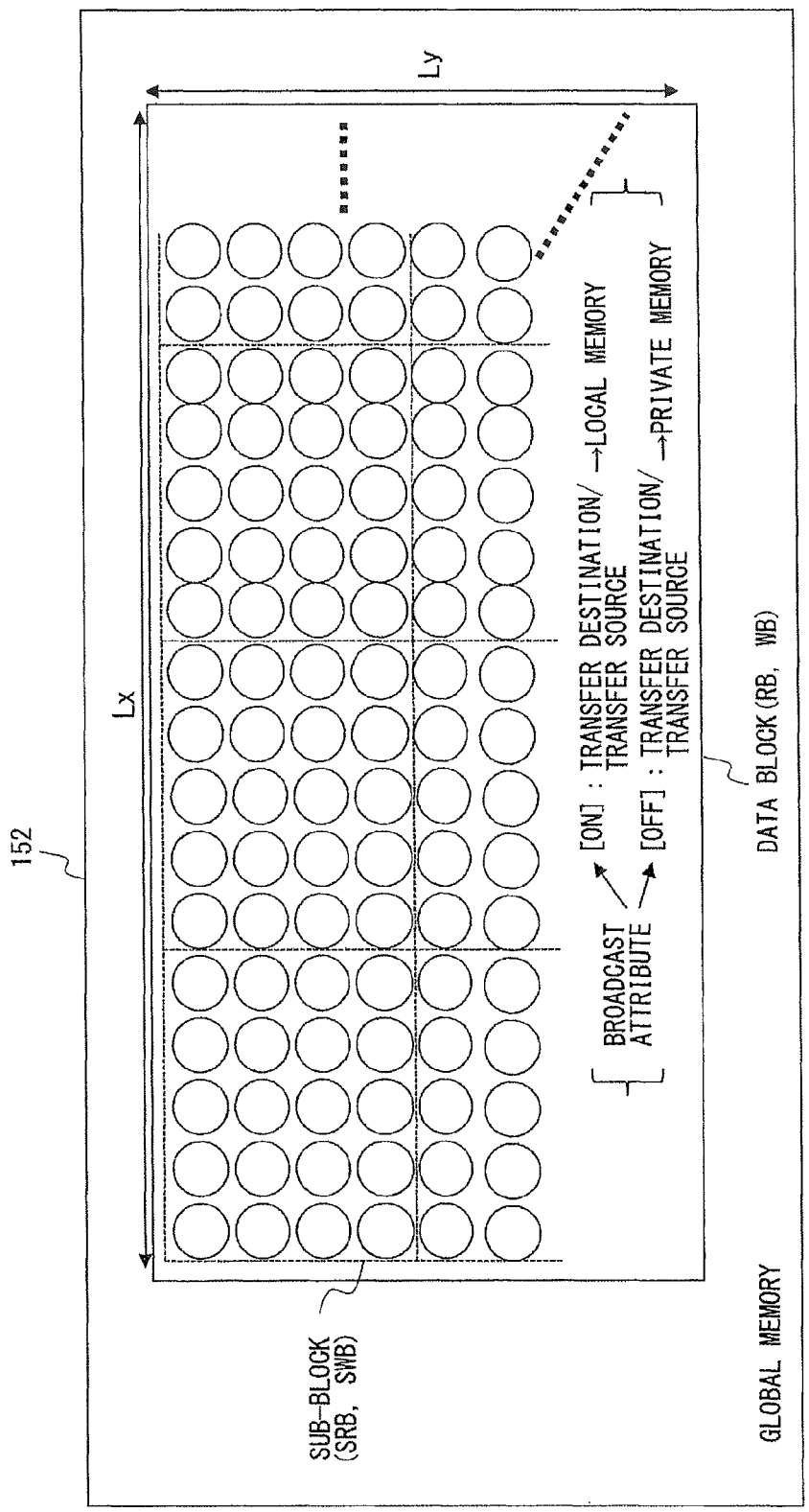
FIG. 5 is a diagram illustrating a broadcast attribute.

This attribute is a parameter that specifies which of the private memory group and the local memory the transfer destination of the sub-read block SRB of each read block is or the transfer source of the sub-write block SWB of each write block is, and it is either "ON" or "OFF". For example, as shown in FIG. 5, the broadcast attribute "ON" specifies the local memory as transfer destination or the transfer source, and the broadcast attribute "OFF" specifies the private memory as transfer destination or the transfer source.

The broadcast attribute of the data blocks shown in FIG. 2 is described. Note that, because specification of the broadcast attribute is also related to other attributes, it is difficult to describe the broadcast attribute only. Therefore, only the values of the broadcast attribute specified for each of the data blocks shown in FIG. 2 are described, and the details of the meaning of those values are described later.

For the read block P, the broadcast attribute is set to "ON". Thus, at the transfer of the read block P, each sub-read block SRB is transferred to the local memory 170.

For the read block Q and the write block R, the broadcast attribute is set to "OFF". Thus, at the transfer of the read block Q, each sub-read block SRB is transferred to the private memory 164. Further, the sub-write block SWB of the write block R is transferred from the private memory group to the global memory 152.

<Allocation Attribute>

This attribute is a parameter indicating how to allocate the sub-read blocks SRB and the sub-write blocks SWB to the private memory group/the local memory of the CU 160.

In the OpenCL system 100 according to this embodiment, two allocation methods, "length-first" and "width-first", are supported.

Before describing the allocation attribute in detail, the work group size WGs and the amount of data allocated to one item are described.

The "work group size WGs" corresponding to the data block with the broadcast attribute "OFF" is the amount of data represented by the number of items in one work group, and, for example, when the number of items is N, the work group size WGs is N words. On the other hand, the work group size WGs corresponding to the data block with the broadcast attribute "ON" is always regarded as 1. Hereinafter, the "work group size WGs" corresponding to the data block with the broadcast attribute "OFF" is referred to simply as the work group size WGs. Although the work group size WGs is determined later by the scenario determination unit 230 of the arithmetic control unit 200 in the device 120, a user can specify which of its maximum value and minimum value is taken at the time of creating the kernel.

Further, the amount of data allocated to one item is also determined by the scenario determination unit 230. The case where the work group size WGs takes the minimum value is when one item corresponds to one PE. On the other hand, in the case of the OpenCL device that can specify a maximum of M times the work group size WGs by segmenting the private memory of the PE into M (M is an integer of two or more) blocks so that M number of items correspond to one PE, the maximum value is M times the minimum value. On the other hand, in the case of using the maximum value of the work group size WGs, the private memory per one PE is one-Mth that when using the minimum value of the work group size WGs. Hereinafter, to simplify the description, it is assumed that the scenario determination unit 230 always uses the minimum value of the work group size WGs and, because one item corresponds to one PE, the term "PE" is used in place of the term "item" in the following description.

"Length-first" is a method of allocating a data block so that the size in the X-direction of the sub-block (SBsx) is the work group size WGs, and the size in the Y-direction (SBsy) is the amount of data allocated to one item, which is the amount of data allocated to one PE.

Each sub-block in the data block for which "length-first" is specified as the allocation attribute is transferred between the global memory 152 and the private memory 164 so that one sub-block corresponds to one work group, and one column of data in the sub-block corresponds to the private memory 164 of one PE 162 in the work group.

Figure 6:
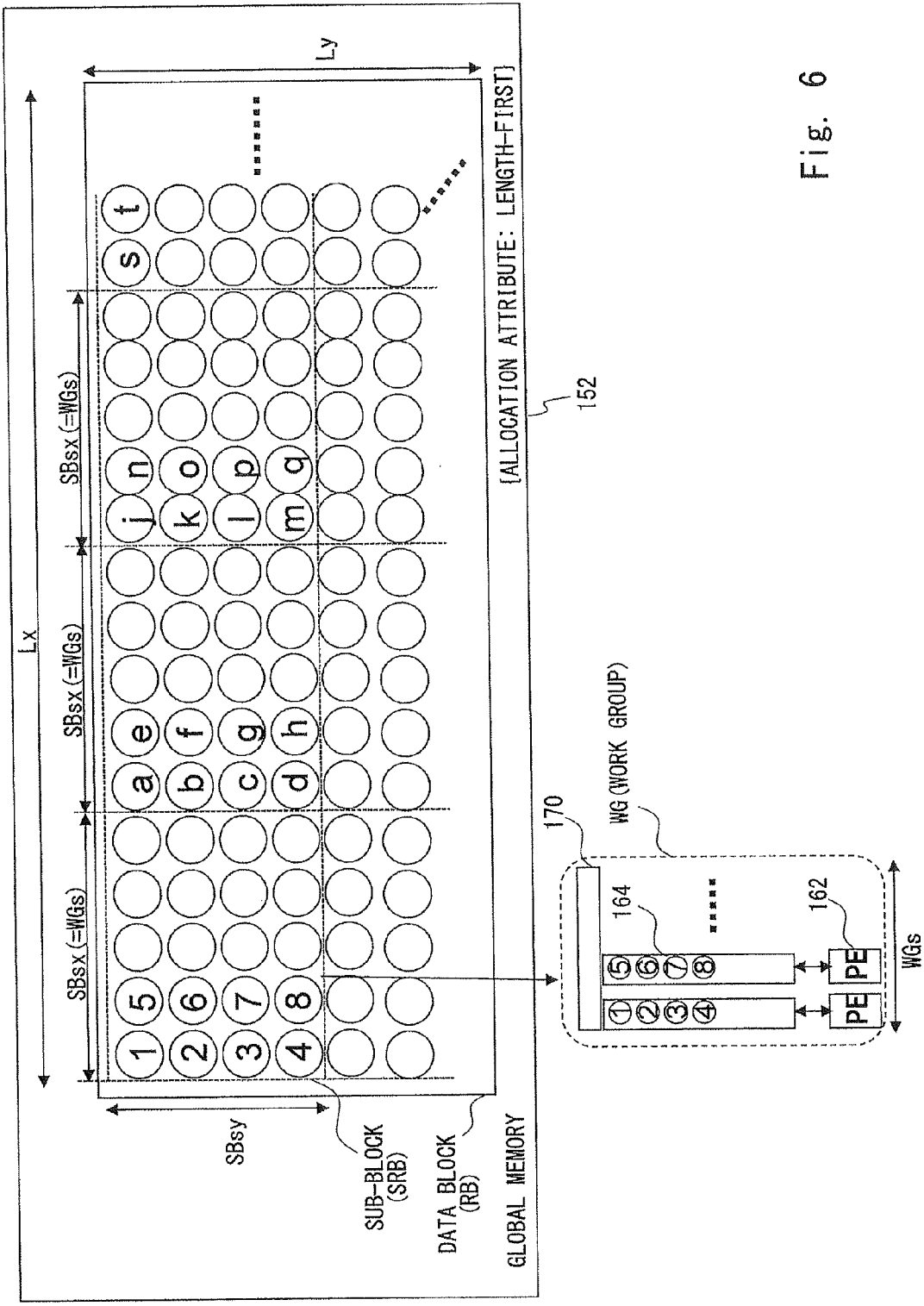
FIG. 6 is a diagram illustrating an allocation attribute.

FIG. 6 shows an example of the case of the read block for which "length-first" is specified as the allocation attribute. In this case, in each sub-read block SRB is transferred from the global memory 152 to the private memory 164 so that all the data in the sub-read block SRB is stored into the private memory 164 of the PE 162 in the same work group and the same column of data in the sub-block is stored into the private memory 164 of the same PE 162.

"Width-first" is a method of allocating a data block so that the size SBsx in the X-direction of the sub-block is an integral multiple of the work group size WGs. Note that size SBsy in the Y-direction of the sub-block is determined later by the scenario determination unit 230.

In each sub-block in the data block for which "width-first" is specified as the allocation attribute, one sub-block corresponds to one work group, and all the data in the sub-block is transferred to the private memory 164 of the PE 162 included in the same work group. Further, in each row of the sub-block, data of the an integral number of segment blocks obtained by segmenting each row by the amount of the work group size WGs are equally distributed to the private memory 164 of the WGs number of PE 162 in the same work group for each segment block.

Figure 7:
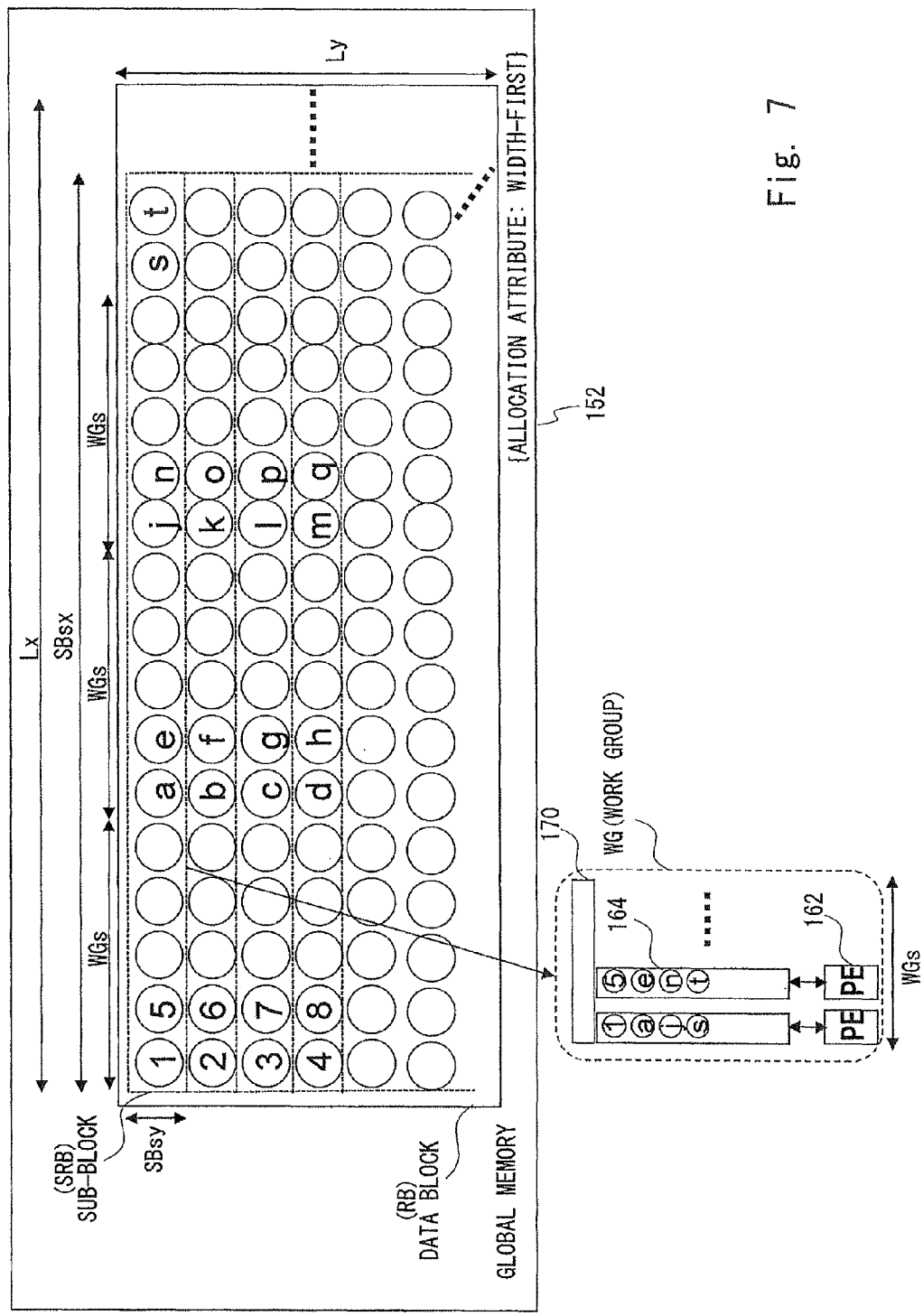
FIG. 7 is another diagram illustrating an allocation attribute.

FIG. 7 shows an example of the case of the read block for which "width-first" is specified as the allocation attribute. Note that, in this example, the size SBsy in the Y-direction of the sub-write block SWB is one word. Thus, this read block is segmented so that the size SBsx in the X-direction of the sub-read block SRB is an integral multiple of the work group size WGs and the number of rows is one.

As shown in this figure, in this case, each sub-read block SRB of the read block is transferred so that all the data in the sub-read block SRB is stored into the private memory 164 of the PE 162 in the same work group. Further, it is transferred so that data of an integral number of segment blocks obtained by segmenting the sub-read block SRB in the row direction by the amount of the work group size WGs are equally distributed to the private memory 164 of the WGs number of PE 162 in the same work group for each segment block. For example, a plurality of data from data 1 to data immediately before data a constitute one segment block and are transferred so that they are stored into the private memory 164 of a plurality of PE 162 in the same work group. Further, a plurality of data from data a to data immediately before data j also constitute one segment block and are transferred so that they are stored into the private memory 164 of a plurality of PE 162 in the same work group.

The allocation attribute of the data blocks shown in FIG. 2 is described. Note that, because specification of the allocation attribute is also related to specification of other attributes, it is difficult to describe the allocation attribute only. Therefore, only the values of the allocation attribute specified for each of the data blocks shown in FIG. 2 are described, and the details of the meaning of those values are described later.

It is assumed that "length-first" is specified as the allocation attribute for the read block P, and "length-first" is specified as the allocation attribute also for the read block Q and the write block R.

<Hierarchy Attribute>

This attribute is the hierarchy number specified by one or more natural numbers. In a plurality of read blocks for which the same hierarchy number is specified, one sub-block SB is transferred each by one-time read or write transfer.

The hierarchy attribute of the data blocks shown in FIG. 2 is described. Note that, because specification of the hierarchy attribute is also related to specification of other attributes, it is difficult to describe the hierarchy attribute only. Therefore, only the values of the hierarchy attribute specified for each of the data blocks shown in FIG. 2 are described, and the details of the meaning of those values are described later.

The hierarchy attribute is specified as "2" and "1" for the read block P and the read block Q, respectively. Further, the hierarchy attribute is specified as "1" for the write block R.

<Dependence Attribute>

This attribute is a parameter indicating the data dependence between a sub-block and eight other sub-blocks adjacent to the sub-block for the data block, and "dependence" or "no dependence" can be specified. For "dependence", three types of dependence can be further specified.

There are three types of "dependence": R1, R2 and R3. They are described with reference to FIG. 8. Note that, in FIG. 8, the region surrounded by the dotted line indicates the sub-block SB, and the numeral indicates the order of transfer.

Figure 8:
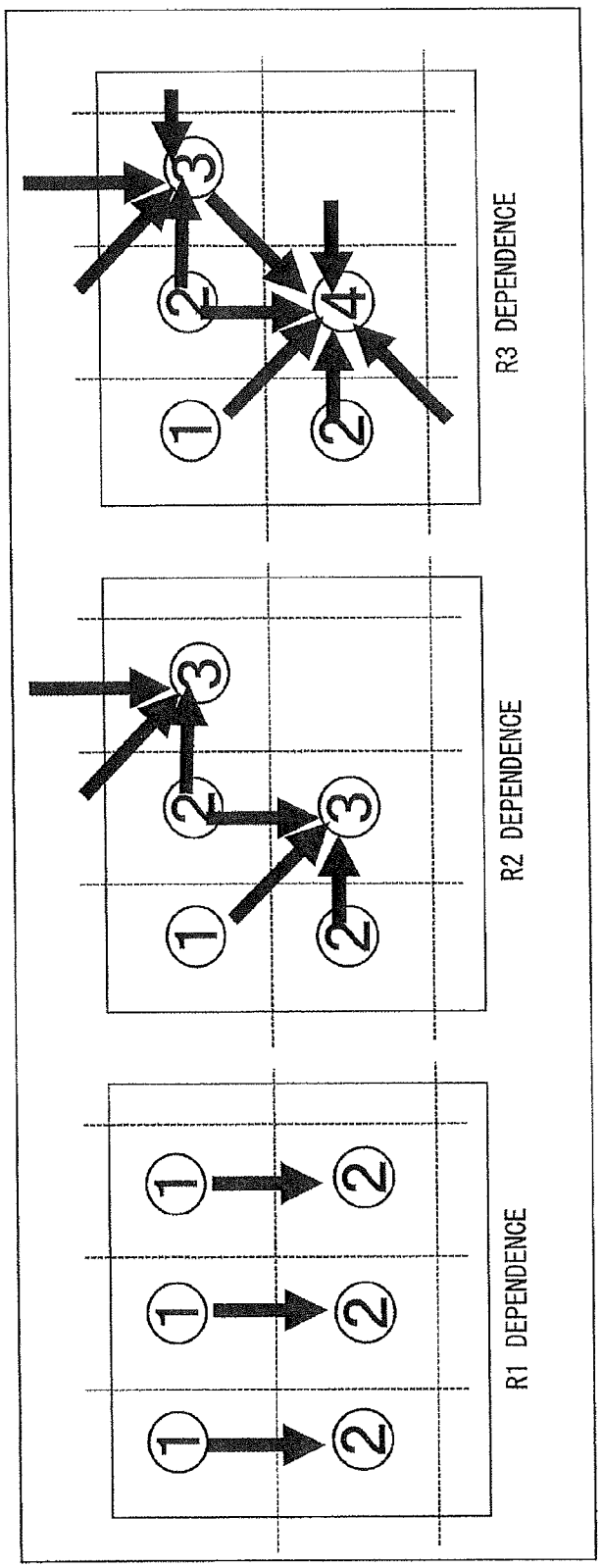
FIG. 8 is a diagram illustrating a dependence attribute.

FIG. 8 shows R1 to R3 dependences in the case where the allocation attribute and the read attribute are specified as "length-first" and "TOP LEFT", respectively.

As shown in the figure, in this case, "R1 dependence" is specified in the case where there is dependence with the upper sub-block SB viewed from the target sub-block SB. "R2 dependence" is specified in the case where there is dependence with the upper, upper left, and left sub-blocks SB viewed from the target sub-block SB. "R3 dependence" is specified in the case where there is dependence with the six sub-block SB excluding the lower and lower write blocks viewed from the target sub-block SB out of the eight adjacent sub-blocks.

The dependence attribute of the data blocks illustrated in FIG. 2 is described. Note that, because specification of the dependence attribute is also related to other attributes, it is difficult to describe the dependence attribute only. Therefore, only the values of the dependence attribute specified for each of the data blocks shown in FIG. 2 are described, and the details of the meaning of those values are described later.

In this example, the dependence attribute is specified as "NONE" for all of the read block P, the read block Q and the write block R.

The eight attributes that are supported in the OpenCL system 100 according to this embodiment are described above. All of those eight attributes do not depend on the configuration of the arithmetic unit 140 in the device 120. The attribute group that is set for each of the three data blocks shown in FIG. 2 is shown in summary in FIG. 9 for easier understanding of the description provided later.

In the OpenCL system 100 according to this embodiment, arguments of the kernel transferred from the host 110 to the device 120 include the above-described attribute group specified for each of the data block to be processed and the data block as a processing result. The attribute group storage unit 210 in the arithmetic control unit 200 of the device 120 stores those attribute groups and supplies them to the scenario determination unit 230.

The scenario determination unit 230 determines a transfer scenario (which is also referred to hereinafter simply as "scenario"), which is described later, based on each of the attribute groups stored in the attribute group storage unit 210 and further controls arithmetic processing by the arithmetic unit 140 and transfer of data involved in the arithmetic processing based on the determined scenario. Note that, during the above control, the scenario determination unit 230 repeatedly transmits an instruction set to the arithmetic unit 140. The instruction set includes a read transfer instruction R, an arithmetic execution instruction S, and a write transfer instruction W. Further, one-time transmission of the instruction set means transmitting the read transfer instruction R, the arithmetic execution instruction S and the write transfer instruction W in this order.

In the arithmetic unit 140, read transfer is performed in response to the read transfer instruction R from the arithmetic control unit 200.

Next, in response to the arithmetic execution instruction S from the arithmetic control unit 200, arithmetic processing is performed by the PE 162 of the arithmetic unit 140 on the data that has been stored in the private memory 164/the local memory 170 by the read transfer performed in response to the read transfer instruction R. Each data as a processing result is stored into the corresponding private memory 164/the local memory 170 of each PE 162.

Then, in response to the write transfer instruction W from the arithmetic control unit 200, the data (processing result) stored in the private memory 164/the local memory 170 is transferred to the global memory 152 by write transfer.

A scenario determination process by the scenario determination unit 230 is described hereinafter.

The scenario determination unit 230 determines a scenario based on the attribute groups stored in the attribute group storage unit 210 and the parameters indicating the configuration of the arithmetic unit 140. The scenario corresponds to the transfer method.

The operation of the scenario determination unit 230 is described hereinbelow. In the following description, the example shown in FIG. 2 is used for the arithmetic processing and the data blocks. Note that, it is assumed that the attribute group is set as shown in FIG. 9 for each of the data blocks shown in FIG. 2 and stored in the attribute group storage unit 210. Further, an example of the parameters indicating the configuration of the arithmetic unit 140 is shown in FIG. 10.

In the above-description of the attributes, it is assumed that one item corresponds to one PE for easier understanding. In the following description, it is assumed that one PE can correspond to one or more items.

The scenario determination unit 230 performs determination of a transfer method according to the rules described below and control of arithmetic processing according to the determined transfer method.

<Rule 1>

The scenario determination unit 230 first sets a common work group size WGs on all of the data blocks and further determines the segment size of the data block and the number of repetitions so that a plurality of data blocks with the same hierarchy attribute are segmented into the sub-blocks with the common number of segments.

The "segment size" indicates the size of the sub-block, and the "number of segments" indicates the number of sub-blocks obtained by segmenting one data block. When the number of segments is one, it means that the data block is not segmented. Further, the "number of repetitions" indicates the number of transfers required to transfer all the sub-blocks of the data block.

The data block size, the segment size, the number of segments, the work group size WGs, the number of repetitions and the like have the relationships represented by the following equations (2) to (5).
(2) Data block size=X-direction size Lx×Y-direction size Ly
(3) Segment size=X-direction size SBsx×Y-direction size SBsy of Sub-block
(4) Number of segments=Data block size÷(Segment size× Work group size WGs)
(5) Number of repetitions={Number of segments×(X-direction size Lx÷Work group size WGs)/Number of WG The scenario determination unit 230 determines the work group size WGs and the segment size (to be exact, the Y-direction size SBsy of the sub-block) so that the sum of the segment size and the total amount of margins when the margin attribute is specified (or "0" when the margin attribute is not specified) does not exceed the total value of the available capacity of the private memory of each item and that the constraint that the data blocks having the same hierarchy attribute are segmented into the same number of segments is satisfied, for each of the data block (read block) where the read attribute is not "NONE" or the data block (write block) where the write attribute is not "NONE" among the data blocks where the broadcast attribute is "OFF". Note that, based on the assumption of satisfying the above constraint, if there is a recommended work group size WGs of the target OpenCL device, the work group size WGs may be employed, and if the upper limit and the lower limit of the work group size WGs are set, the work group size WGs is determined within the range defined by the upper limit and the lower limit.

<Rule 2>

Transfer the sub-read block SRB group including the corresponding sub-read block SRB of the read block with the same hierarchy attribute simultaneously to the private memory or local memory space, and start user specification processing. When the margins are specified by the margin attribute for the sub-read block SRB to be transferred, transfer data of the margins as well.

<Rule 3>

After transferring the sub-read block SRB group of the corresponding sub-read block SRB to the private memory or local memory space by the number of times as multiplication of the number of segments of the data blocks with different hierarchy attributes, start user specification processing.

For example, when it is assumed that the number of segments of the read block with the hierarchy attribute "1" is N and the number of segments of the read block with the hierarchy attribute "2" is M, the scenario determination unit 230 operates to call the user specification processing N×M number of times. Further, before calling each time, one type of combination of the sub-read blocks SRB is transferred to the private memory or local memory space.

The scenario determination unit 230 determines the association method of the sub-blocks (the allocation method and the integration method in the transfer method described above) and then performs transfer. As shown in FIG. 12, the association method is different between the sub-blocks of the data blocks in the same hierarchy and the sub-blocks of the data blocks in different hierarchies.

<Rule 4>

After starting the user specification processing each time, transfer the sub-write block SWB as a result of arithmetic processing to the global memory space. The transfer of the sub-write block SWB is performed after starting the user specification processing, and it is the same as the case of the sub-read block SRB except that the direction of transfer is "from the private memory and/or the local memory space to the global memory space".

Figure 11:
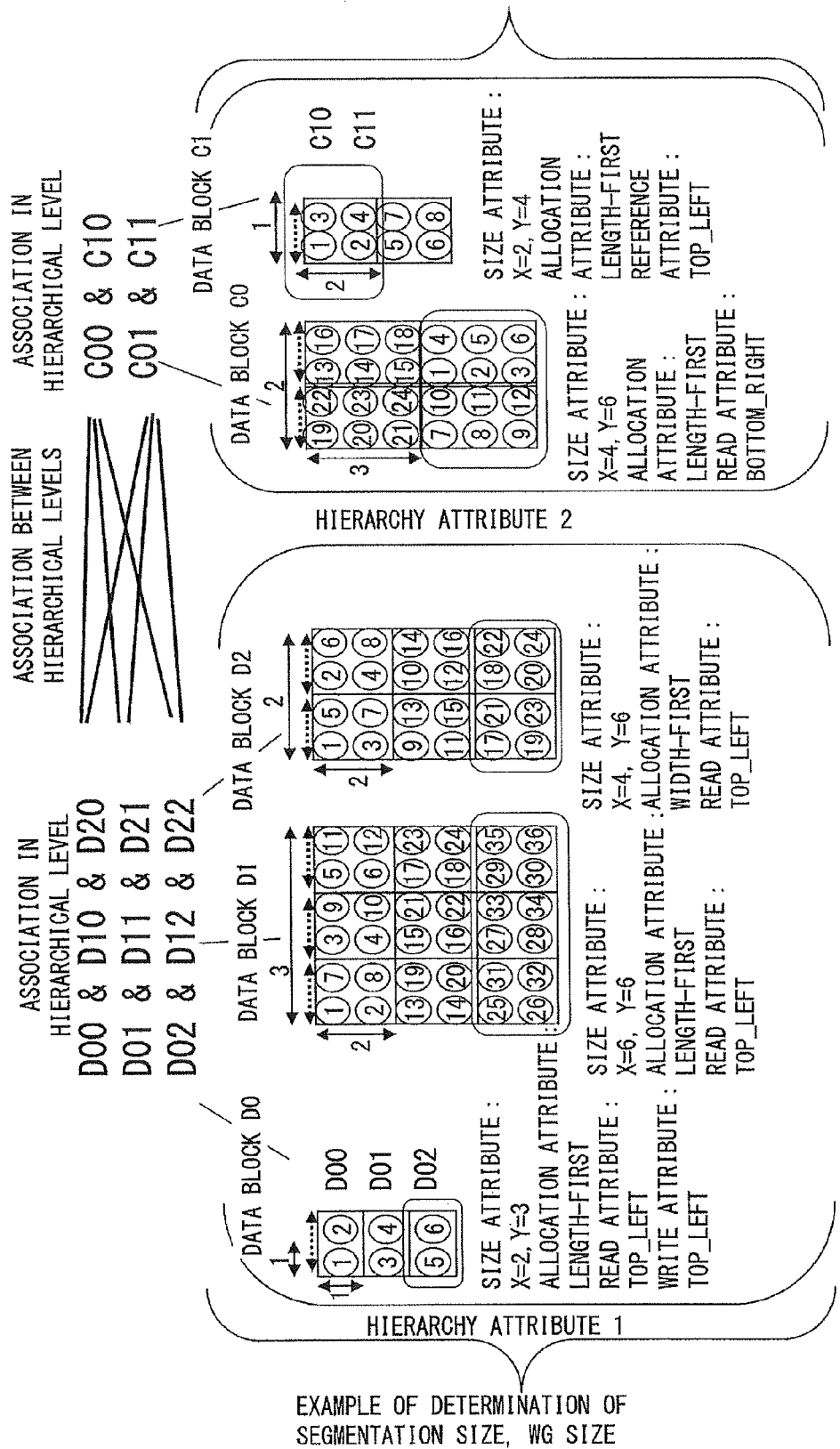
FIG. 11 is a diagram showing association in a hierarchy and between hierarchies.

FIG. 11 shows an example of the work group size WGs, the lengthwise segment size (the Y-direction size SBsy of the sub-block) and the number of repetitions that are determined by the scenario determination unit 230 based on the attribute group specified for the read block P, the read block Q and the write block R shown in FIG. 9 and the configuration of the arithmetic unit 140 shown in FIG. 10.

The scenario determination unit 230 first tentatively determines the work group size WGs (32) of the arithmetic unit 140. When the number of segments of each data block with the hierarchy attribute "1" is four, the private memory occupancy by the read block Q is 0.258 KB ("129×2B") for each item. Note that 129 is the value obtained by adding 9 in the Y direction specified by the margin attribute to "Y-direction size Ly(480) of read block Q/Number of segments(4)" (lengthwise segment size). Likewise, the private memory occupancy by the write block R is obtained as 0.738 KB ("(480/4)×4B") for each work item WI.

Because the sum of the private memory occupancies by the read block Q and the write block R for each item is less than the private memory capacity (1 KB) for each item in the parameter (FIG. 10) indicating the configuration of the arithmetic unit 140, the rule 1 is satisfied, and the work group size WGs and the segment size of the read block Q and the write block R are determined. Further, the number of repetitions is calculated as "5" by the above-described equation (6).

Further, the read block P with the hierarchy attribute "2" is allocated to the local memory because the broadcast attribute is "ON". Further, because its size (3×3=9) is smaller than the local memory capacity 4 KB of each work group WG, it is transferred to the local memory without segment (the number of repetitions: 1).

Finally, the operation of the scenario determination unit 230 in the case where there is the data block with the dependence attribute "dependence" is summarized. For easier understanding of the following description, a sub-block group where each data block is segmented into the respective segment size and associated is referred to as "sub-block set".

In the case where the sub-blocks are dependent between the sub-block sets, the scenario determination unit 230 controls the order of repetition so that, after the depending sub-block set is processed, the depended sub-block set is processed. Assuming that one sub-block MX in the sub-block set M0 has dependence with one sub-block MY in the sub-block set M1 and the sub-block MX is the source of definition, the sub-block sets M0 and M1 are in dependence, M0 is the depending sub-block set on M1 and M1 is the depended sub-block set by M0.

As described above, the OpenCL system 100 performs processing on a single kernel. Note that, in the case where there are a plurality of single kernels in sequence, the OpenCL system 100 repeats the above-described processing for each kernel.

<In the Case of Two Related Kernels>

It is assumed that the two kernels are a first kernel X and a second kernel Y. The two kernels are related to each other means that a continuous write block is included in the write block as a processing result of the first kernel X executed first and the continuous write block is used as the read block to be processed of the subsequent second kernel Y. In other words, the continuous read block is included in the read block of the second kernel Y.

Figure 13:
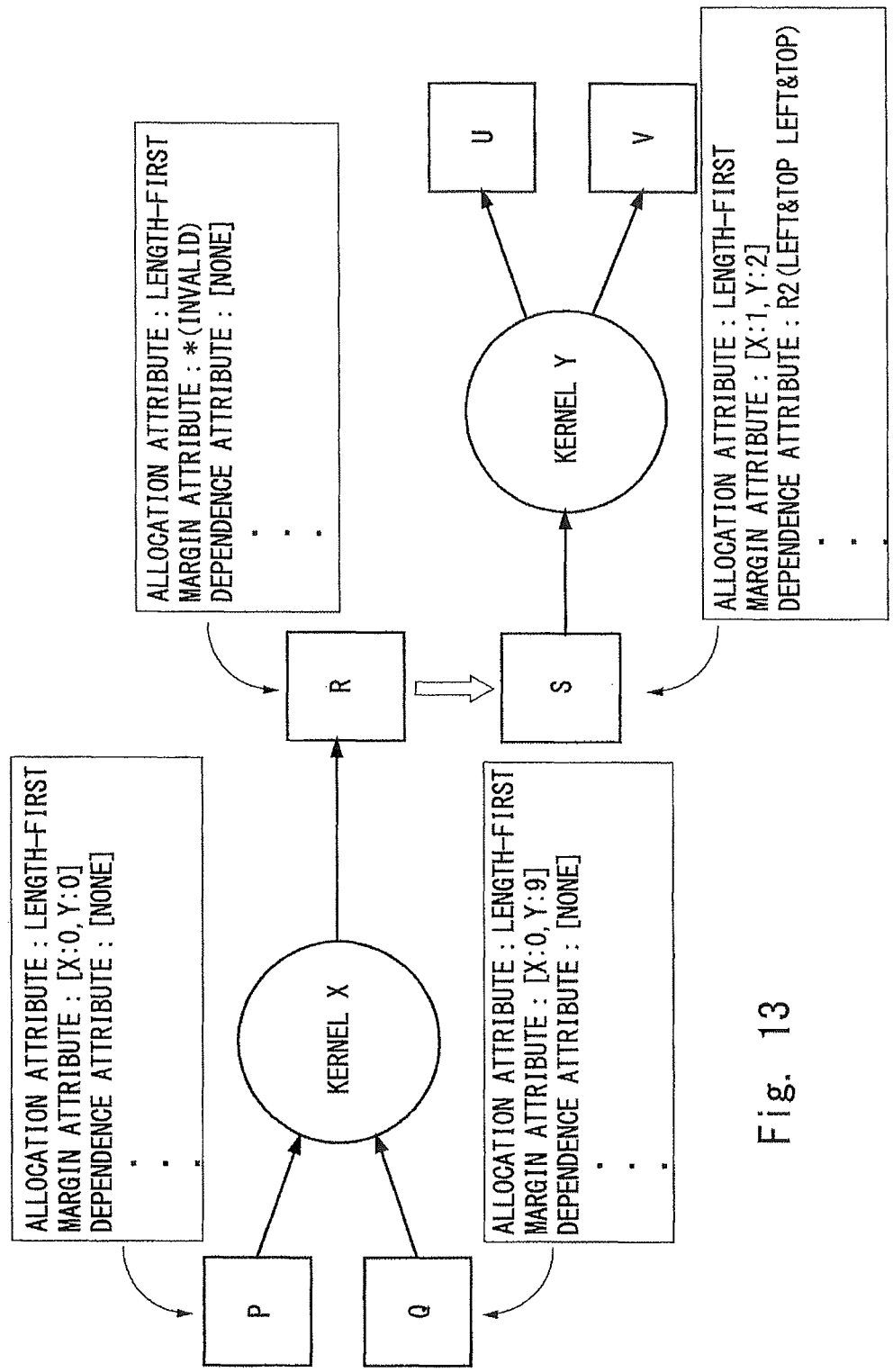
FIG. 13 is a diagram illustrating pipelining control performed when executing two related kernels in succession.

FIG. 13 shows the read block and the write block of the two kernels. Among those data blocks, the data block R is the continuous write block, and the data block S is the continuous read block corresponding to the continuous write block R. Although the continuous write block R and the continuous read block S are the same data block, because different attribute groups are set for the write block of the first kernel X and the read block of the second kernel Y, they are illustrated as different data blocks and denoted by different reference symbols for easier understanding.

The attribute groups of the data blocks shown in FIG. 13 are stored in the attribute group storage unit 210 of the arithmetic control unit 200. Those attribute groups are the same as the attribute groups described in the case of the single kernel.

Further, information indicating that the second kernel Y is executed after the first kernel X and that the write block R of the first kernel X is used as the read block S of the second kernel Y is stored as the inter-kernel data block dependence information in the inter-kernel information storage unit 220 of the arithmetic control unit 200.

As an example, it is assumed that the first kernel X is the kernel for performing arithmetic processing of the example shown in FIG. 2. Therefore, the read block of the first kernel X is the data blocks P and Q, the write block of the first kernel X is the data block R, and the data block R is the continuous write block that is used for the subsequent second kernel Y.

Further, as described in the case of the single kernel, in the attribute group of the read block P, the allocation attribute is "length-first", the margin attribute is "X:0, Y:0" (no margin), and the dependence attribute is "NONE" (no dependence between the sub-read blocks).

Further, it is assumed that the second kernel Y processes the data block S, which is the same data block as the write block R of the first kernel X, and obtains the data blocks U and V. Therefore, the read block of the second kernel Y is the data block S, and the data block S is the continuous read block. Further, the write block of the second kernel Y is the data blocks U and V.

In the example of the figure, in the attribute group of the continuous read block S, the allocation attribute is "length-first", the margin attribute is "X:1, Y:2", and the dependence attribute is "R2" (depending on the left, upper left and upper sub-blocks).

Specifically, it is specified by the margin attribute to, when transferring the continuous read block S by segmenting it into sub-blocks, transfer one column of data each on the left and right sides of the sub-block and two rows of data each on the upper and lower sides of the sub-block together with the sub-block. Further, the transfer and the order of arithmetic processing of the sub-blocks of the continuous read block S are specified by the dependence attribute so that the depending sub-blocks (the three sub-blocks on the left, upper left and upper sides of the target sub-block in this example) are processed before the target sub-block is processed.

The attribute group is set also for the write blocks U and V of the second kernel Y, and those blocks are set by a user according to the arithmetic content of the second kernel Y or the like, and detailed description and illustration thereof are omitted.

In this embodiment, the scenario determination unit 230 of the arithmetic control unit 200 determines whether to perform pipelining control based on the allocation attribute of the continuous write block R and the allocation attribute of the continuous read block S. To be specific, the scenario determination unit 230 determines to perform pipelining control if the allocation attributes of the continuous write block R and the continuous read block S are the same, and determines not to perform pipelining control if the allocation attributes of the continuous write block R and the continuous read block S are different.

The "pipelining control" is to execute the first kernel X and the second kernel Y in a pipeline by not transferring the continuous write block R to the global memory 152 and using it for execution of the second kernel Y through the private memory 164 or the local memory 170.

When it is determined not to perform pipelining control, the scenario determination unit 230 treats each of the first kernel X and the second kernel Y as a single kernel, and controls the first kernel X to be executed first and, after all the data of the write block R is obtained and stored into the global memory 152, controls the second kernel Y to be executed using the write block R as the read block S of the second kernel Y.

When it is determined to perform pipelining control, the scenario determination unit 230 changes the margin attribute and the dependence attribute of each data block of the first kernel X executed first in order to realize pipelining control.

To be specific, the scenario determination unit 230 logically adds the margin attribute and the dependence attribute of the continuous read block S to the margin attribute and the dependence attribute of the read block P of the first kernel X and thereby obtains new margin attribute and dependence attribute.

Likewise, the scenario determination unit 230 logically adds the margin attribute and the dependence attribute of the continuous read block S to the margin attribute and the dependence attribute of the read block Q and thereby obtains new margin attribute and dependence attribute.

Figure 14:
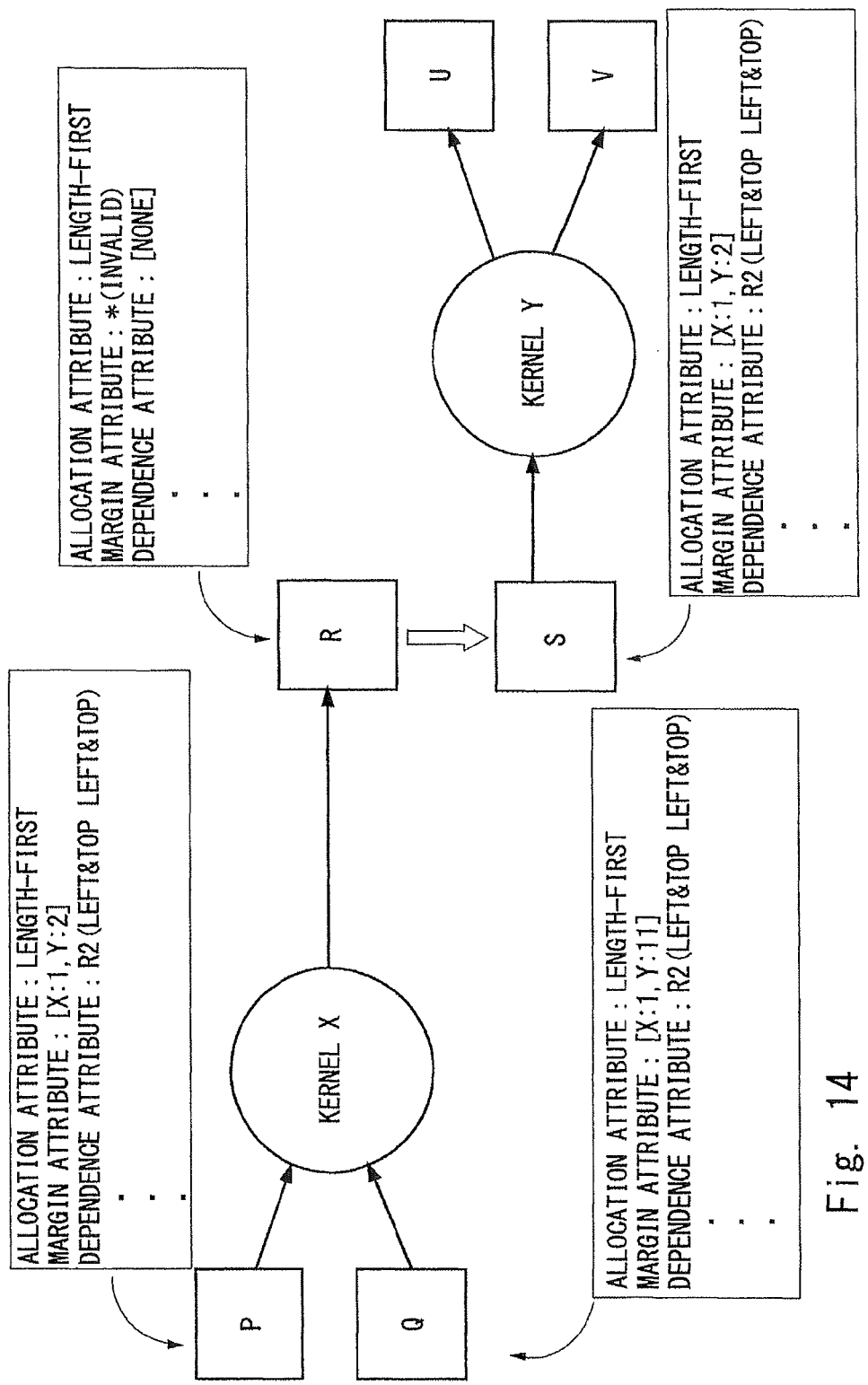
FIG. 14 is another diagram illustrating pipelining control performed when executing two related kernels in succession.

FIG. 14 shows the attribute groups of the read block P and the read block Q after change by the scenario determination unit 230. As shown therein, for the read block P, the margin attribute is changed from "X:0,Y0" to "X:1,Y:2" and the dependence attribute is changed from "NONE" to "R2".

Further, for the read block Q also, the margin attribute is changed from "X:0,Y9" to "X:1,Y:11" and the dependence attribute is changed from "NONE" to "R2".

Then, the scenario determination unit 230 determines the transfer method of each data block by using the attribute group where the margin attribute and the dependence attribute have changed for each write block of the first kernel X and using the original attribute group for the other data blocks, and further performs transfer of the read block and the write block according to the determined transfer method and control of parallel processing corresponding to the transfer. This is the same as the case of the single kernel except for using the sub-blocks of the continuous write block R for execution of the second kernel Y through the private memory 164 or the local memory 170 without transferring them to the global memory 152 and executing the first kernel X and the second kernel Y in parallel.

Figure 15:
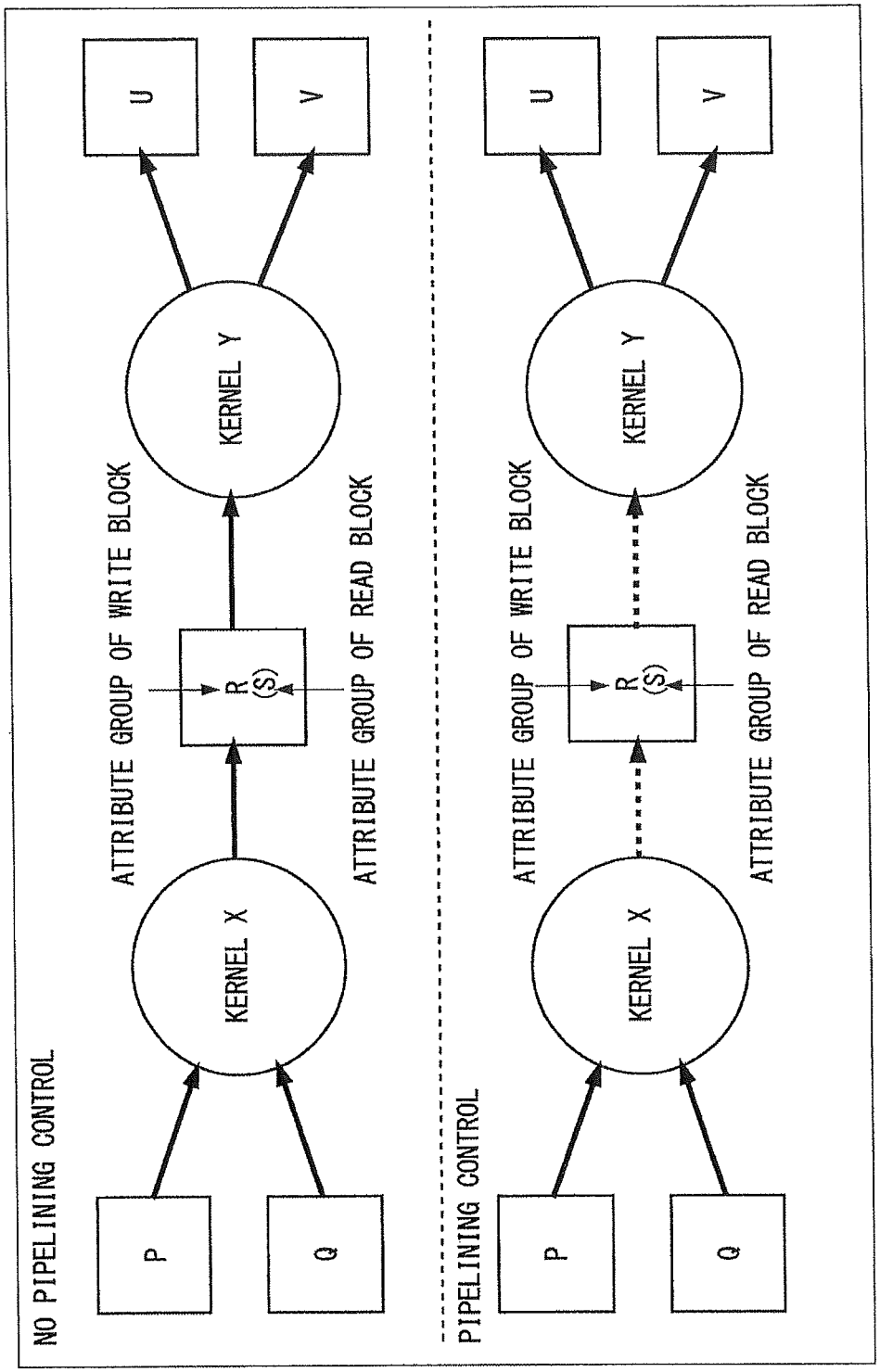
FIG. 15 is a diagram to compare transfer of each data block when pipelining control is not performed and when pipelining control is performed.

The upper part of FIG. 15 shows the transfer of each data block in the case where pipelining control is not performed in the execution of the first kernel X and the second kernel Y, and the lower part of FIG. 15 shows the transfer of each data block in the case where pipelining control is performed in the execution of the first kernel X and the second kernel Y. In this figure, the solid line arrow indicates passing of data through the global memory 152, and the dotted line arrow indicates passing of data through the private memory 164 or the local memory 170.

As shown in FIG. 15, in the case where pipelining control is not performed, the write block R (continuous write block) as a processing result of the first kernel X is stored into the global memory 152 and then transferred as the read block S (continuous read block) of the second kernel Y from the global memory 152 to the private memory 164 or the local memory 170 and used for execution of the second kernel Y.

On the other hand, in the case where pipelining control is performed, the continuous write block R is not transferred to the global memory 152 and used for execution of the second kernel Y through the private memory 164 or the local memory 170.

Note that, for passing of data through the private memory 164 or the local memory 170, processing of generating the data and processing of performing arithmetic processing using the data may be allocated to the same PE, for example, and the PE may read the data generated by the previous processing and stored in the private memory 164 or the local memory 170 and use it for the subsequent processing.

Further, in the case where the respective PE of the OpenCL device are connected in a ring and each PE can pass data to the adjacent PE on the ring, the PE that has performed the previous processing may pass the data generated in the previous processing through each PE with the PE that performs the next processing.

Figure 16:
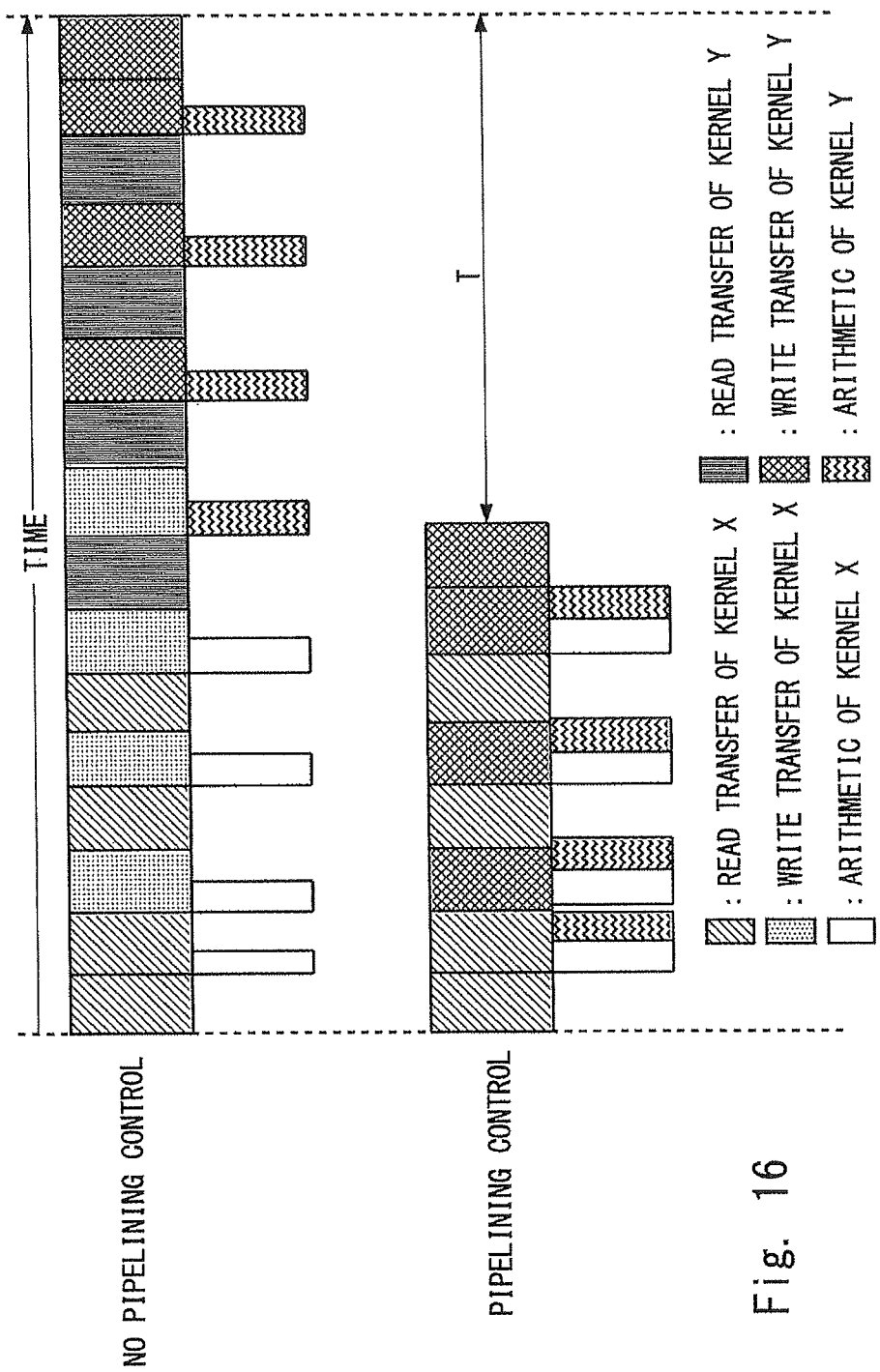
FIG. 16 is a diagram to compare execution of kernels when pipelining control is not performed and when pipelining control is performed.
Figure 17:
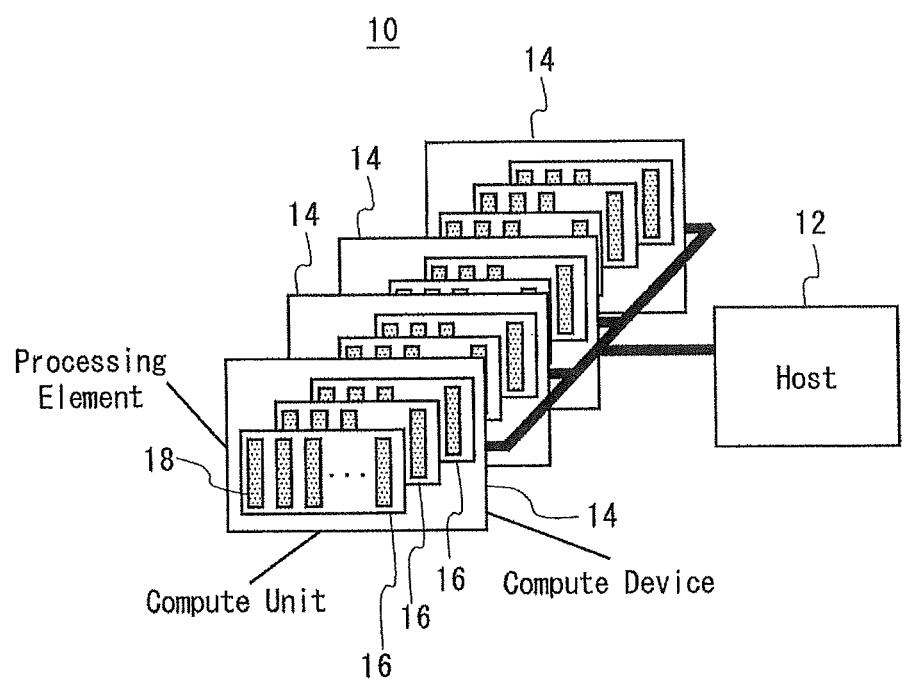
FIG. 17 is a diagram showing a platform model of an OpenCL system.
Figure 18:
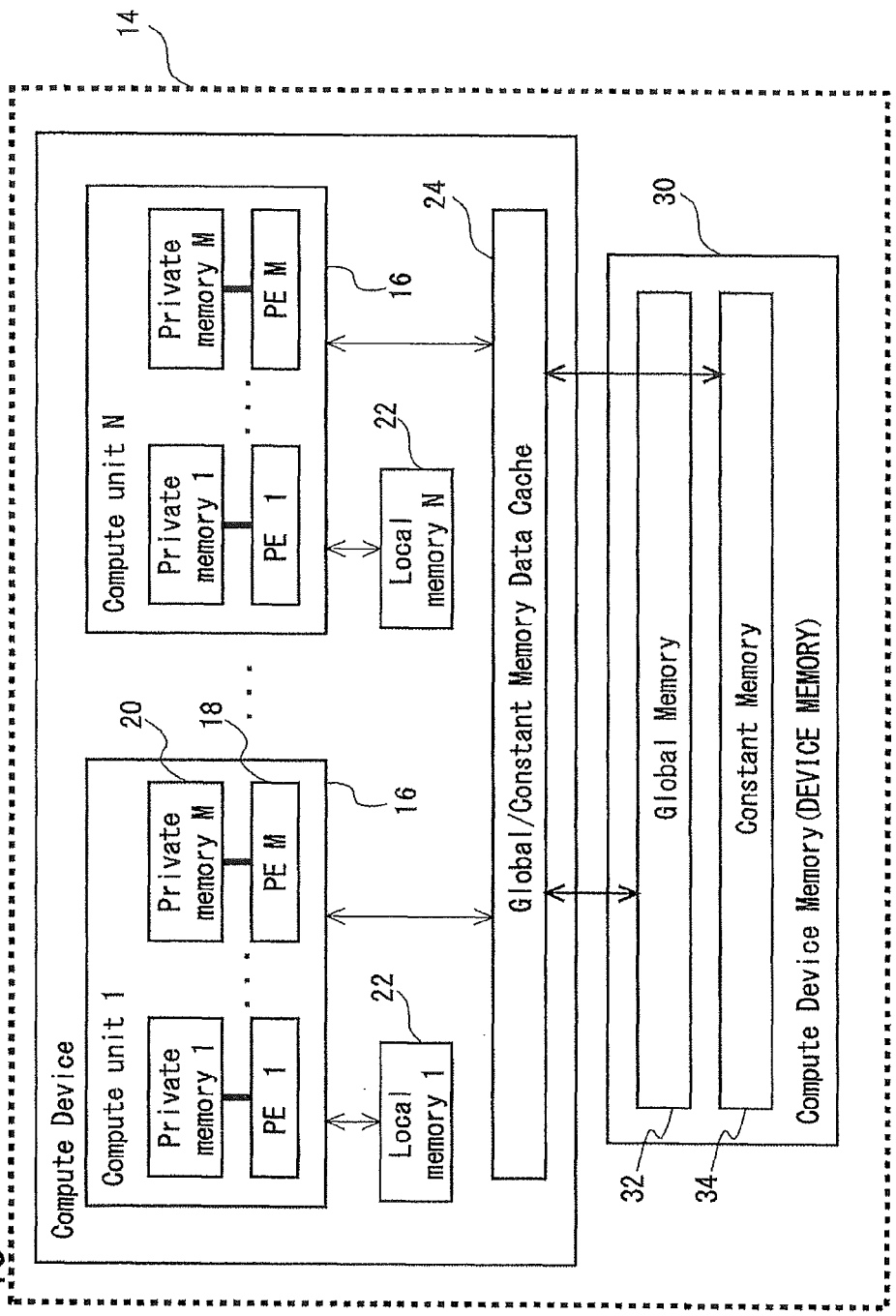
FIG. 18 is a diagram showing a configuration of an OpenCL device.
Figure 20:
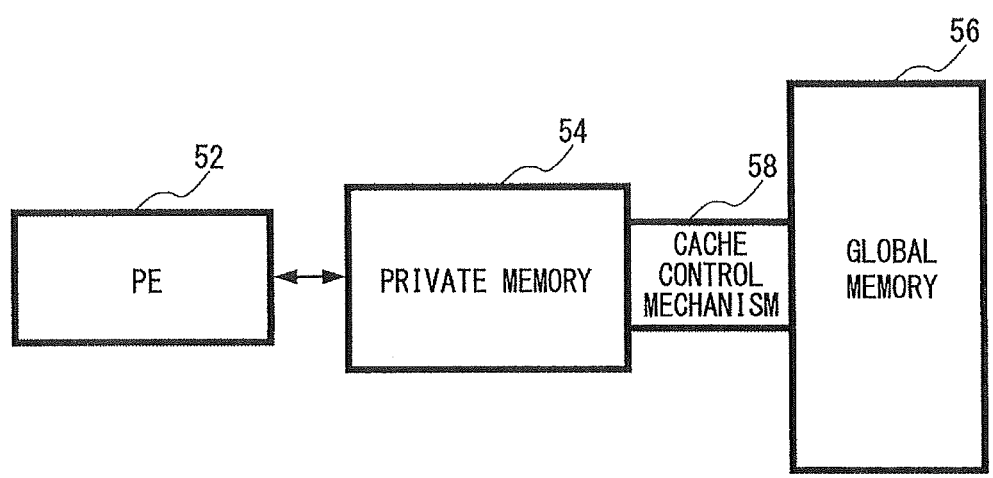
FIG. 20 is a diagram showing an example of a serial processor.
Figure 21:
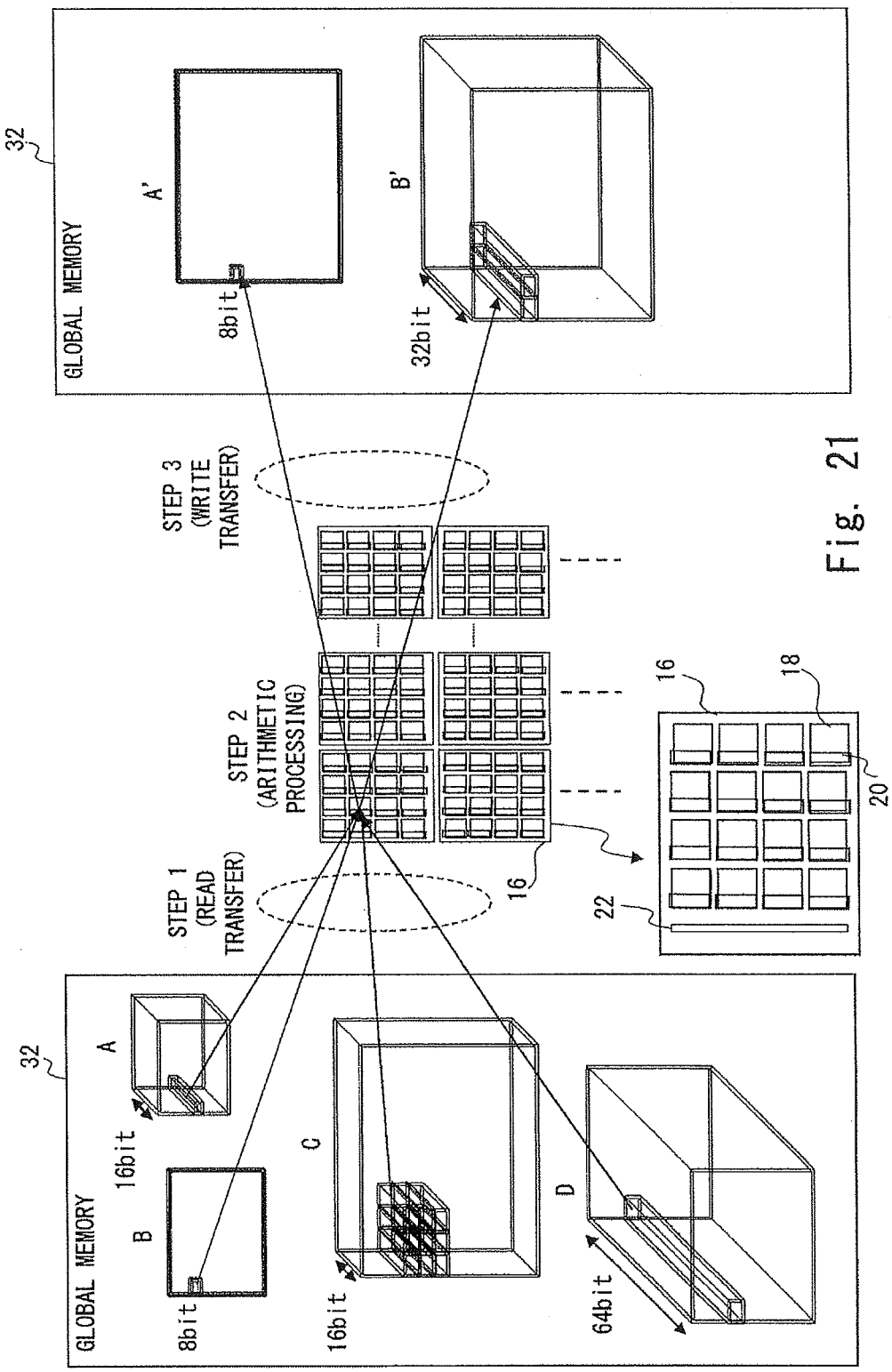
FIG. 21 is a diagram illustrating a problem addressed by the technique disclosed in patent Literature 1.

The upper part of FIG. 16 shows the execution of the first kernel X and the second kernel Y in the case where pipelining control is not performed, and the lower part of FIG. 16 shows the execution of the first kernel X and the second kernel Y in the case where pipelining control is performed.

In FIG. 16, the region shaded with diagonal lines indicates a period of read transfer for the first kernel X, and the region shaded with dots indicates a period of write transfer for the first kernel X. Further, the region shaded with vertical lines indicates a period of read transfer for the second kernel Y, and the region shaded with a net indicates a period of write transfer for the second kernel Y.

Further, the blank region indicates a period of execution of the first kernel X, and the region shaded with wavy lines indicates a period of execution of the second kernel Y.

As shown in FIG. 16, in the case where pipelining control is not performed, each of the first kernel X and the second kernel Y is executed as an independent kernel, and each time it is executed, read transfer of the sub-read block (transfer from the global memory to the private memory/the local memory) and write transfer of the sub-write block (from the private memory/the local memory to the global memory) are performed.

On the other hand, in the case where pipelining control is performed, write transfer of the sub-write block generated by each execution of the first kernel X is not performed, and read transfer of the sub-read block (the sub-write block generated by the first kernel X) to be processed by each execution of the second kernel Y is not performed.

Further, because read transfer of the sub-read block to be processed in execution of the second kernel Y is not performed, read transfer for the next execution of the first kernel X can be performed in parallel with execution of the second kernel Y.

As described above, when executing the first kernel X and the second kernel Y in succession, the arithmetic control unit 200 of the device 120 in the OpenCL system 100 according to this embodiment can use the sub-block of the continuous write block as it is for the sub-block of the continuous read block when the continuous write block to be used as the read block of the second kernel Y is included in each write block of the first kernel X, and the allocation attribute of the continuous write block and the allocation attribute of the read block (continuous read block) of the second kernel Y corresponding to the continuous write block are the same, and thereby achieving execution of the first kernel X and the second kernel Y in a pipeline.

To be specific, when performing pipelining control, the scenario determination unit 230 first logically adds the margin attribute of the continuous read block of the second kernel Y to the margin attribute of each read bock of the first kernel X to thereby change the margin attribute of each read bock of the first kernel X and further logically adds the dependence attribute of the continuous read block of the second kernel Y to the dependence attribute of each read bock of the first kernel X to thereby change the attribute group of each read bock of the first kernel X.

Then, based on the attribute group of each data block of the first kernel X and the second kernel Y (for the read block of the first kernel X, the attribute group after change), the scenario determination unit 230 determines the transfer method of each data block, and performs transfer of each data block according to the determined transfer method and control of parallel processing corresponding to the transfer. At this time, the first kernel X and the second kernel Y are executed in a pipeline by not transferring each sub-block of the continuous write block to the global memory and using it for execution of the second kernel Y through the private memory or the local memory and further executing the first kernel X and the second kernel Y in parallel.

As shown in FIG. 16, as a result of pipelining control of the scenario determination unit 230, the time to complete execution of the first kernel X and the second kernel Y is shorter than that when not performing pipelining control by the length "T", and the processing speed of the OpenCL device increases.

Note that, because the margin attribute of the continuous read block of the second kernel Y is logically added to the margin attribute of each read block of the first kernel X in order to execute the first kernel X and the second kernel Y in a pipeline, there is a possibility that the total sum of the size of the sub-read block of the first kernel X and the size of the data transferred together with the sub-read block exceeds the capacity of the private memory or the local memory.

In order to avoid this, the scenario determination unit 230 may determine to perform pipelining control on condition that the allocation attribute of the continuous write block of the first kernel X and the allocation attribute of the continuous read block of the second kernel Y are the same and further the size of the sub-read block of the first kernel X determined based on the changed margin attribute at the time of transfer is equal to or less than a preset threshold. Note that the threshold may be set in advance according to the size of the private memory and/or the local memory.

Further, although executing two related kernels in a pipeline is described above for easier understanding, three or more related kernels may be executed in a pipeline in the same principle.

Specifically, when there are N (N is a positive number of two or more) number of kernels executed in succession and the read block of each kernel executed second or subsequently includes the write block of the kernel executed just before, the scenario determination unit 230 determines to perform pipelining control only when the allocation attribute of the continuous write block of the K($1 \leq K \leq N-1$)th kernel X and the allocation attribute of the continuous read block of the (K+1)th kernel which corresponds to the continuous write block are the same.

When the scenario determination unit 230 determines to perform pipelining control, it logically adds the margin attribute of the continuous read block of the second or subsequent kernel to the margin attribute of each read block of the first kernel, and further logically adds the dependence attribute of the continuous read block of the second or subsequent kernel to the dependence attribute of each read block of the first kernel.

After that, when the scenario determination unit 230 determines the transfer method of each data block, transfers each data block according to the determined transfer method and controls parallel processing corresponding to the transfer, it executes those kernels in a pipeline by using each sub-block of the continuous write block for execution of the next kernel through the private memory or the local memory without transferring it to the global memory and further executing those kernels in parallel.

As the number of kernels to be executed in a pipeline increases, the transfer size of the sub-read block of the first kernel increases. In order to prevent the transfer size of the sub-read block of the first kernel from exceeding the capacity of the private memory or the local memory, the scenario determination unit 230 may divide the N number of kernels into a plurality of groups composed of one or more kernels executed in succession and perform pipelining control for each group. For the grouping, the transfer size of the sub-read block of the kernel to be executed first in the group which is determined based on the changed margin attribute is set to be less than a predetermined threshold.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An arithmetic control apparatus that controls parallel processing by a plurality of processing elements of an OpenCL (Open Computing Language) device including the plurality of processing elements and a plurality of memories in different hierarchies provided for the plurality of processing elements, comprising:

an attribute group storing unit that acquires and stores an attribute group set for each of a read block being one or more data blocks stored in a memory in a lowest hierarchy among the plurality of memories and having data transferred to a memory in a different hierarchy for the parallel processing and a write block being one or more data blocks transferred from the memory in the different hierarchy to the memory in the lowest hierarchy after the parallel processing as a result of the parallel processing on the one or more read blocks; and a scenario determination unit that determines a transfer method of each of the read block and the write block based on each of the attribute group stored in the attribute group storing unit and a configuration parameter indicating a configuration of the OpenCL device, and performs transfer of the read block and the write block according to the determined transfer method and control of the parallel processing corresponding to the transfer, wherein the attribute group includes a plurality of attributes required for determining the transfer method and not depending on the configuration of the OpenCL device, including:
- an allocation attribute indicating whether to segment the data block into a plurality of sub-blocks and transfer the sub-blocks and indicating a segmentation method when segmenting the data block,
- a margin attribute indicating a size of data neighboring the sub-blocks transferred together with the sub-blocks when segmenting the data block into a plurality of sub-blocks and transferring the sub-blocks, and
- a dependence attribute indicating whether the sub-blocks have dependence with other neighboring sub-blocks when segmenting the data block into a plurality of sub-blocks and transferring the sub-blocks and indicating all dependence directions when there is the dependence, the attribute group of the write block is set based on an assumption that the write block already exists in the memory in the different hierarchy and is transferred to the memory in the lowest hierarchy, when a first kernel and a second kernel are executed in succession in the OpenCL device, the write block of parallel processing corresponding to the first kernel includes a continuous write block used as the read block of parallel processing corresponding to the second kernel, and the allocation attribute of the continuous write block set for the first kernel and the allocation attribute of the read block corresponding to the continuous write block set for the second kernel are the same, the scenario determination unit performs pipelining control that executes the first kernel and the second kernel in a pipeline by using the continuous write block for execution of the second kernel through the memory in the different hierarchy without transferring the continuous write block to the lowest hierarchy, and in the pipeline control, the scenario determination unit logically adds the margin attribute and the dependence attribute of the read block corresponding to the continuous write block set for the second kernel respectively to the margin attribute and the dependence attribute set for the read block for each of the read block corresponding to the first kernel.

2. An arithmetic control method that controls parallel processing by a plurality of processing elements of an OpenCL (Open Computing Language) device including the plurality of processing elements and a plurality of memories in different hierarchies provided for the plurality of processing elements, comprising:

a first step of acquiring and storing an attribute group set for each of a read block being one or more data blocks stored in a memory in a lowest hierarchy among the plurality of memories and having data transferred to a memory in a different hierarchy for the parallel processing and a write block being one or more data blocks transferred from the memory in the different hierarchy to the memory in the lowest hierarchy after the parallel processing as a result of the parallel processing on the one or more read blocks; and a second step of determining a transfer method of each of the read block and the write block based on each of the stored attribute group and a configuration parameter indicating a configuration of the OpenCL device, and performing transfer of the read block and the write block according to the determined transfer method and control of the parallel processing corresponding to the transfer, wherein the attribute group includes a plurality of attributes required for determining the transfer method and not depending on the configuration of the OpenCL device, including:
- an allocation attribute indicating whether to segment the data block into a plurality of sub-blocks and transfer the sub-blocks and indicating a segmentation method when segmenting the data block,
- a margin attribute indicating a size of data neighboring the sub-blocks transferred together with the sub-blocks when segmenting the data block into a plurality of sub-blocks and transferring the sub-blocks, and
- a dependence attribute indicating whether the sub-blocks have dependence with other neighboring sub-blocks when segmenting the data block into a plurality of sub-blocks and transferring the sub-blocks and indicating all dependence directions when there is the dependence, the attribute group of the write block is set based on an assumption that the write block already exists in the memory in the different hierarchy and is transferred to the memory in the lowest hierarchy, in the second step, when a first kernel and a second kernel are executed in succession in the OpenCL device, the write block of parallel processing corresponding to the first kernel includes a continuous write block used as the read block of parallel processing corresponding to the second kernel, and the allocation attribute of the continuous write block set for the first kernel and the allocation attribute of the read block corresponding to the continuous write block set for the second kernel are the same, pipelining control that executes the first kernel and the second kernel in a pipeline is performed by using the continuous write block for execution of the second kernel through the memory in the different hierarchy without transferring the continuous write block to the lowest hierarchy, and in the pipeline control, the margin attribute and the dependence attribute of the read block corresponding to the continuous write block set for the second kernel are respectively logically added to the margin attribute and the dependence attribute set for the read block for each of the read block corresponding to the first kernel.

3. A non-transitory computer readable medium storing a program for controlling parallel processing by a plurality of processing elements of an OpenCL (Open Computing Language) device including the plurality of processing elements and a plurality of memories in different hierarchies provided for the plurality of processing elements, the program causing a computer to execute:
  a first step of acquiring and storing an attribute group set for each of a read block being one or more data blocks stored in a memory in a lowest hierarchy among the plurality of memories and having data transferred to a memory in a different hierarchy for the parallel processing and a write block being one or more data blocks transferred from the memory in the different hierarchy to the memory in the lowest hierarchy after the parallel processing as a result of the parallel processing on the one or more read blocks; and
  a second step of determining a transfer method of each of the read block and the write block based on each of the stored attribute group and a configuration parameter indicating a configuration of the OpenCL device, and performing transfer of the read block and the write block according to the determined transfer method and control of the parallel processing corresponding to the transfer, wherein
  the attribute group includes a plurality of attributes required for determining the transfer method and not depending on the configuration of the OpenCL device, including:
    an allocation attribute indicating whether to segment the data block into a plurality of sub-blocks and transfer the sub-blocks and indicating a segmentation method when segmenting the data block,
    a margin attribute indicating a size of data neighboring the sub-blocks transferred together with the sub-blocks when segmenting the data block into a plurality of sub-blocks and transferring the sub-blocks, and
    a dependence attribute indicating whether the sub-blocks have dependence with other neighboring sub-blocks when segmenting the data block into a plurality of sub-blocks and transferring the sub-blocks and indicating all dependence directions when there is the dependence,
  the attribute group of the write block is set based on an assumption that the write block already exists in the memory in the different hierarchy and is transferred to the memory in the lowest hierarchy,
  in the second step, when a first kernel and a second kernel are executed in succession in the OpenCL device, the write block of parallel processing corresponding to the first kernel includes a continuous write block used as the read block of parallel processing corresponding to the second kernel, and the allocation attribute of the continuous write block set for the first kernel and the allocation attribute of the read block corresponding to the continuous write block set for the second kernel are the same, pipelining control that executes the first kernel and the second kernel in a pipeline is performed by using the continuous write block for execution of the second kernel through the memory in the different hierarchy without transferring the continuous write block to the lowest hierarchy, and
  in the pipeline control, the margin attribute and the dependence attribute of the read block corresponding to the continuous write block set for the second kernel are respectively logically added to the margin attribute and the dependence attribute set for the read block for each of the read block corresponding to the first kernel.

4. An OpenCL device comprising:
  a plurality of processing elements;
  a plurality of memories in different hierarchies provided for the plurality of processing elements; and
  an arithmetic control unit that controls parallel processing by the plurality of processing elements, the arithmetic control unit including:
    an attribute group storing unit that acquires and stores an attribute group set for each of a read block being one or more data blocks stored in a memory in a lowest hierarchy among the plurality of memories and having data transferred to a memory in a different hierarchy for the parallel processing and a write block being one or more data blocks transferred from the memory in the different hierarchy to the memory in the lowest hierarchy after the parallel processing as a result of the parallel processing on the one or more read blocks; and
    a scenario determination unit that determines a transfer method of each of the read block and the write block based on each of the attribute group stored in the attribute group storing unit and a configuration parameter indicating a configuration of the OpenCL device, and performs transfer of the read block and the write block according to the determined transfer method and control of the parallel processing corresponding to the transfer, wherein
  the attribute group includes a plurality of attributes required for determining the transfer method and not depending on the configuration of the OpenCL device, including:
    an allocation attribute indicating whether to segment the data block into a plurality of sub-blocks and transfer the sub-blocks and indicating a segmentation method when segmenting the data block,
    a margin attribute indicating a size of data neighboring the sub-blocks transferred together with the sub-blocks when segmenting the data block into a plurality of sub-blocks and transferring the sub-blocks, and
    a dependence attribute indicating whether the sub-blocks have dependence with other neighboring sub-blocks when segmenting the data block into a plurality of sub-blocks and transferring the sub-blocks and indicating all dependence directions when there is the dependence,
  the attribute group of the write block is set based on an assumption that the write block already exists in the memory in the different hierarchy and is transferred to the memory in the lowest hierarchy,
  when a first kernel and a second kernel are executed in succession in the OpenCL device, the write block of parallel processing corresponding to the first kernel includes a continuous write block used as the read block of parallel processing corresponding to the second kernel, and the allocation attribute of the continuous write block set for the first kernel and the allocation attribute of the read block corresponding to the continuous write block set for the second kernel are the same, the scenario determination unit performs pipelining control that executes the first kernel and the second kernel in a pipeline by using the continuous write block for execution of the second kernel through the memory in the different hierarchy without transferring the continuous write block to the lowest hierarchy, and in the pipeline control, the scenario determination unit logically adds the margin attribute and the dependence attribute of the read block corresponding to the continuous write block set for the second kernel respectively to the margin attribute and the dependence attribute set for the read block for each of the read block corresponding to the first kernel.

* * * * *